United States Patent [19]

Cannon et al.

[11] Patent Number: 4,719,855

[45] Date of Patent: Jan. 19, 1988

[54] COMPUTER CONTROLLED WEB FEED METHOD, APPARATUS AND SYSTEM FOR WEB TREATMENT APPARATUS SUCH AS ROTARY DIE CUTTER

[75] Inventors: David C. Cannon; Stephen P. Lyles, both of Hartsville, S.C.

[73] Assignee: Sonoco Products Company, Hartsville, S.C.

[21] Appl. No.: 891,799

[22] Filed: Aug. 1, 1986

[51] Int. Cl.⁴ ............................................. B41F 13/54
[52] U.S. Cl. ................................... 101/426; 101/223; 101/228; 364/469
[58] Field of Search ............... 101/426, 223, 226, 227, 101/228, 230, 231, 232, 248; 226/143; 364/469

[56] References Cited

U.S. PATENT DOCUMENTS

| | | | |
|---|---|---|---|
| 3,625,147 | 12/1971 | Rubenstein | 101/223 |
| 4,264,957 | 4/1981 | Pautzke | 304/468 |
| 4,366,753 | 1/1983 | Glantz | 101/227 |
| 4,416,200 | 11/1983 | Yon | 101/228 |
| 4,545,518 | 10/1985 | Bergland | 101/223 |
| 4,584,047 | 4/1986 | Vanderpool et al. | 101/288 |
| 4,592,278 | 6/1986 | Tokuno et al. | 101/228 |

*Primary Examiner*—E. M. Eickholt
*Attorney, Agent, or Firm*—Dennison, Meserole, Pollack & Scheiner

[57] ABSTRACT

Web treatment apparatus, such as a rotary die cutting machine, is provided with a die cylinder position encoder for generating pulses as the die cylinder rotates, feed roll position encoder for generating pulses as the feed rolls rotate; voltage dependent stored program driven servo drive for rotating the feed rolls; pull-off rolls for withdrawing web material from a supply roll and maintaining a storage loop thereof leading to the feed rolls; and a microprocessor based system including manually settable input for inputting the die length and length of pullback desired between cutting cycles. A position controller monitors die cutter speed and position from the die cylinder position encoder and provides voltage signals to the feed roll servo drive dependent upon the inputted data to provide velocity and acceleration profile for the feed rolls appropriate to the entered die length. It also provides a voltage signal to the pull-off roll drive to initialize the rate of input of web to the storage loop. A photocell detector system further adjusts pull-off roll drive speed to maintain the loop within preset limits. To maintain registration control, and to preserve synchronization of the feed roll servo with the die, the die cylinder may also generate a timing pulse on each revolution thereof.

17 Claims, 10 Drawing Figures

FEED ROLL VELOCITY (RAD/SEC) VS.
DIE CUTTER POSITION (IN.)

VELOCITY PROFILE (CONSTANT ACCELERATION VELOCITY PROFILE SHOWN)

COMPUTER CONTROLLED WEB FEED METHOD, APPARATUS AND SYSTEM FOR WEB TREATMENT APPARATUS SUCH AS ROTARY DIE CUTTER

BACKGROUND OF THE INVENTION

The invention herein is generally concerned with the feeding of web material to high speed rotary treatment apparatus, particularly die cutting apparatus and the like. More specifically, the invention is concerned with an electromechanical computer controlled method and system for the elimination of web material waste between successive blanks treated or cut from the web while simultaneously maximizing the production rate from the die regardless of the die length.

In rotary die cutting, the impression or die cylinder and anvil roll are maintained at constant peripheral velocity during steady state operation. The web while engaged therebetween must move at the same forward velocity. However, since the die cylinder is of a fixed diameter and circumference, dies of differing length leave more or less of the die cylinder periphery unused for cutting so that if the web were continuously fed into the nip at a constant velocity, the web would not be cut into usable blanks as it passed through the unused portion of the die nip. Unless the feeding of the web is controlled to eliminate it, this would result in substantial waste of material passing between the die cylinder and anvil roll during passage through the gap between die passes even if the web were braked while in the gap due to the inherent tendency for the die to pull excess web. Some machines cutting web material on rotary die cutters simply put a drag brake on the web and run the press at low speed. Without pullback, they always experience a 3-4" strip of scrap between passes of the die caused by the inherent overfeed.

In U.S. Pat. No. 3,756,149, issued on Sept. 4, 1973, to Thomas Bishop, there is disclosed apparatus which, through cam controlled feed rolls, achieves a pullback of the web material during that gap or those periods of disengagement by the treatment means or die. While the web control achieved by Bishop 3,756,149 is significant and results in a substantial reduction in waste in a structurally simple and efficient manner, the Bishop apparatus does not provide for a complete elimination of waste between impressions of the trailing edge of the die and the subsequently encountered leading edge thereof on the next revolution. In addition, set-up for differing die lengths is a meticulous and time-consuming, therefore costly, operation. Also, the acceleration rates of the Bishop apparatus are constant, limiting operation to the necessary speed for the longest die lengths and thereby reducing production on short dies.

In U.S. Pat. No. 4,416,200, issued on Nov. 22, 1983, to William S. Yon, there is disclosed apparatus which improves on the Bishop apparatus and includes a cam controlled sequence of operation wherein the web engaged feed rolls, through an engaged clutch, are accelerated and forwardly driven at a constant velocity equal to the die-induced velocity of the web immediately before die engagement. The clutch is then disengaged and the web pulled through the nip by the engaged die. After the die disengages the web, cam drive is then used to cause the web to be pulled back while the die is clear of the web and then be re-accelerated in a forward direction so that upon reengagement of the die with the web, the web will again be traveling at the die velocity and in the die movement direction but with no wastage of web material. Generally, during engagement of the die and web, the feed rolls are declutched and the web is driven solely by the die, although unlike the Bishop apparatus, the feed rolls remain engaged with the web throughout the operating cycle. With the cam system of Yon, this declutching is necessary to enable the cams to reset their followers for the next pullback cycle and acceleration of the web. The acceleration and deceleration of the feed rolls and web, both before and after engagement with the die, and during the pullback part of the cycle, however, are fixed by the cam contour and are not under the operator's control. The amount of pull back is under the control of the set-up mechanic, within the limitation of the constant velocity portion provided in the cam, but achieving registration is still a time-consuming trial and error process and the mechanical cams, clutches, and followers require substantial lubrication and other maintenance. Obviously, the amount of pullback cannot be adjusted while the machine is running as adjustment requires moving the cams with respect to the die.

The longest die that can be accommodated is limited by the cam profiles to about 55" on a 66" circumference die drum, whereas many saleable products lie in the range 55"-60" in length. The new method accommodates dies up to 60" in length.

Further, since the distance over which acceleration and deceleration of the feed rolls occurs in fixed in both the Bishop apparatus and the Yon apparatus by the mechanical cam profiles and the length of the pullback is a fixed optimal amount, on all but the longest die a dwell period is necessary in the web feed cycle to compensate when shorter than maximum length dies are in service. This dwell and the fixed acceleration and deceleration rates result in less than maximum production rate being achieved when less than maximum length dies are in service. Since the acceleration and deceleration rates of the feed rolls of the Yon apparatus are preset by the cam contours, it is not practical to recalculate, remachine or change them with changes between dies of differing lengths. This fixed acceleration/deceleration rate also results in a single maximum die cylinder velocity for all die lengths thereby penalizing any shorter die production by restricting its speed to that allowable for the longest die.

A related or resultant problem to feeding, withdrawing and subsequently re-accelerating the web from a supply roll is not discussed or referred to in the Bishop patent and is merely touched upon by the disclosure of the Yon patent. This related problem is control of the supply roll and pull-off of web material therefrom in a smooth and constant manner while the web is being accelerated, decelerated, advanced, and retracted in a rapid and cyclical manner into and out of the treatment or die cutting means. The massive supply roll cannot be unwound and rewound in accordance with the needs of the feed rolls at the rates required for efficient operation. The Yon patent teaches provision of a slack or supply loop between pull or pull-off rolls which takes web material from the supply roll into the slack or supply loop and feed rolls which take web material from the slack or supply loop into the nip and back again to provide a low inertia buffer zone between the massive supply roll and the cutting die rolls or other treatment means. The driving of the pull or pull-off rolls in Yon is controlled by a set of photocells in a manner whereby the slack loop is maintained in the web beyond the pull rolls, but no specific circuitry or control means therefore is disclosed. In fact, in the Yon apparatus, the pull rate from the supply roll into the loop is manually set by the operator and the photocell detector system operates primarily as a backup to the operator's skill and judgment.

Establishing uniform pull-off of the web from the supply roll initially, however, requires substantial effort by the machine operator, especially during set-up and start-up because differing die lengths result in differing rates of material usage and hence a differing ratio of die cylinder speed to pull-off roll speed. All of these multiple factors must be monitored by the operator and/or set-up technician. The pull-off rolls are preferably kept to a uniform velocity related to overall per cycle usage of material at speed and for any die length so that the massive supply roll becomes part of a stable system without oscillation or other instabilities and need not accelerate and decelerate contantly throughout the cutting cycle each time the web velocity and direction of web travel through the nip changes.

The mechanical cam based systems of Bishop and Yon, therefore, while each providing substantial savings in raw material, still cannot provide optimal set-up, start-up or on-fly adjustment during running conditions. Set-up and start-up of these systems require a great deal of operator experience, effort and skill. Running conditions, while providing material economy better than previously available methods, apparatus and systems, still cannot practicably maximize production rates with differing die lengths since the feed roll cam profiles need to be designed to accommodate the longest die length to be used and cannot be readily changed for each change in die length and speed.

OBJECTS OF THE INVENTION

It is therefore among the primary purposes of the present invention to provide new and improved methods, apparatus, means, and systems for feeding web materials to rotary web treatment apparatus such as rotary die cutting apparatus, particularly high speed rotary die cutting apparatus wherein dies of differing die lengths mounted on die cylinders of a fixed diameter and circumference may be most efficiently used; to advance the teachings of Yon, U.S. Pat. No. 4,416,200; to provide computerized and servo-system control of web movement, including pull-off from a supply roll, deceleration, pullback, acceleration and, with or without the provision of a dwell interval, advancement; to maximize production while minimizing or eliminating wastage of material; to provide increased accuracy of cut, particularly of interrupted cuts wherein separate portions of a blank are cut during successive die passes; to reduce or minimize operator tasks and chores during both set-up and running operation while maximizing operator control; and to provide highly efficient operation of web treatment apparatus, such as high speed rotary die cutting apparatus.

It is also among other primary objects of the present invention, in addition to each of the foregoing objects, to tailor the velocity and acceleration profiles of the web automatically under computer and servo drive control so as to maximize production rate while minimizing material waste; to reduce requirements for operator skill and experience; to reduce or eliminate dwell time of the web; to provide maximum die velocity; to synchronize the web with the die and provide registration therebetween; and to automatically calculate and control proper pull-off roll velocity based on the die speed and die length with adjustment of the commanded speed thus preventing the slack loop length from getting out of bounds due to cumulative error; and to provide re-registration each operating cycle whereby cumulative phase error is averted.

The present invention has the further capability of adjusting the amount of pullback while the machine is running. Even with feed forward control, there may be some product length variation with speed changes. Thus, if the product length on an interrupted cut pattern is perfect at slow speeds after the initial set-up, it may be slightly different at high speed. The ability of the operator to make small corrections while running based on observation will achieve a much more accurate product.

SUMMARY OF THE INVENTION

It is noted that the invention is applicable to all forms of web treatment apparatus, for example, printing as well as rotary die cutting. In the preferred form, a rotary web treatment apparatus, such as a high speed rotary die cutting machine, is provided with die cylinder position encoder means for generating a train of pulses as the die cylinder rotates; feed roll position encoder means for generating a train of pulses as the feed rolls rotate; stored program motion controlled means controlling a driven servo drive motor for rotating at least one of the feed rolls; pull-off roll means with electronically controllable variable speed drive therefor for withdrawing web material from a supply roll and maintaining a storage or slack loop thereof leading to the feed rolls; and a microprocessor based system including manually settable input means for inputting the die length and the length of the pull-back desired between cutting cycles for controlling the pull-off and feed roll drive means in response to a stored program therein and an initializing signal received at least once each cycle generated from the die cylinder. Feedback means may also be provided for monitoring the storage or supply slack loop length.

In accordance with a preferred embodiment, the pulse train from the die cylinder position encoder maintains synchronization between the stored program driving the feed roll servo and the die cutter, the stored program providing a velocity profile for the feed rolls appropriate to the entered die length automatically which maximizes production rates based on the entered die length. It also provides an appropriate voltage signal to the pull-off roll drive to initialize the rate of input of web to the slack or supply loop. A long-or-short slack or supply loop photocell detector system further adjusts the pull-off roll drive speed to maintain the slack or supply loop within preset limits. To maintain registration control, and to preserve synchronization of the feed roll servo with the die, the die cylinder is also provided with means for generating a timing pulse on each revolution thereof, preferably very shortly before engagement of the die with the web. The microprocessor program is initialized each cycle upon receipt of this timing pulse with each revolution of the die cylinder to eliminate any phase error which might accumulate over a number of repetitions of the cycle and any errors in matching the die length with program length or die velocity with feed roll servo velocity.

DETAILED DESCRIPTION OF THE INVENTION

Figure 1:
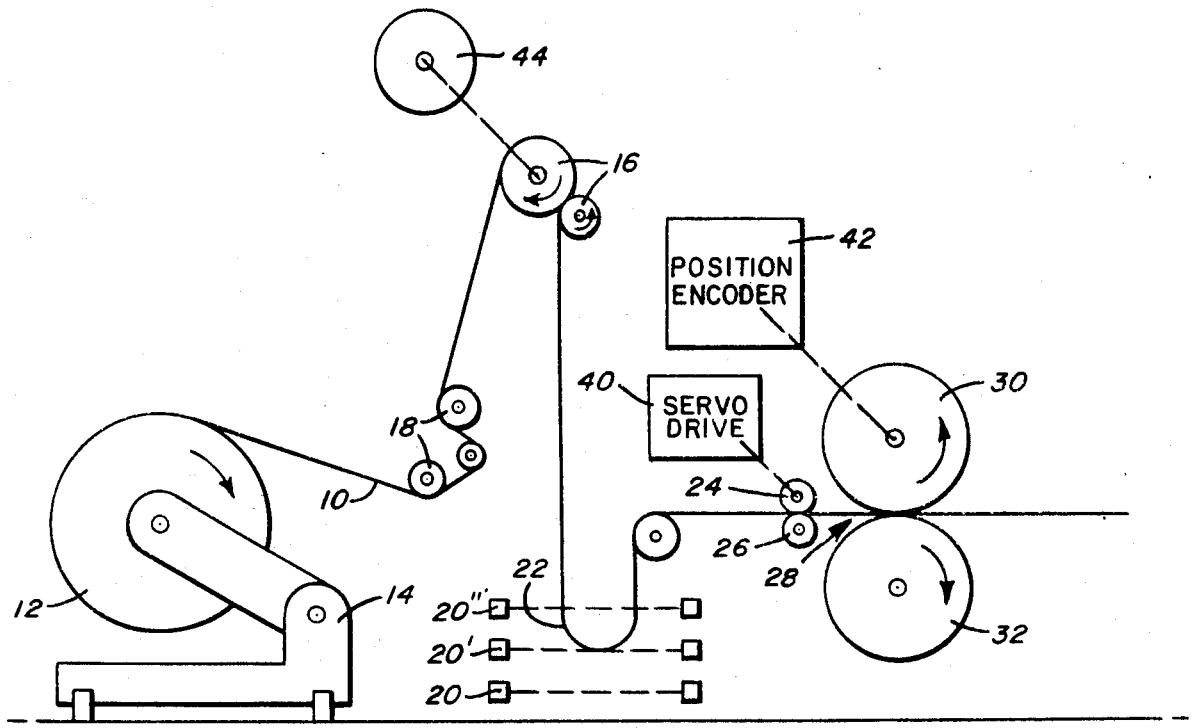
FIG. 1 is a schematic illustration of a die cutter line incorporating the features of the present invention.

As heretofore pointed out, the present invention is an improvement on the invention of prior U.S. Pat. No. 4,416,200 issued Nov. 22, 1983, to William S. Yon. As such, the disclosure thereof is incorporated herein by reference as if fully duplicated hereat. In order to avoid physical duplication, however, while still fully disclosing the present invention, suffice it to be stated that the Yon patent teaches avoidance of material waste and timing registration, particularly of the leading and trailing edges of a means, such as a cutting die, which cuts adjacent or continuing portions of a blank in subsequent passes in web treatment means, such as a high speed rotary web cutter, by pulling the web back through the cutting nip during the gap between passage therethrough of the trailing and leading edges of the die, i.e., when a clearance exists between the nip rolls and then re-accelerating the web to the die speed. In this manner, the leading edge of the die can be arranged to recontact the web at the same location whereat the trailing edge disengaged it and while the web is again moving in the same direction and at the same speed as the die. The Yon patent, however, uses a mechanical cam and clutch arrangement which does not teach nor permit of any practical means for changing the velocity and acceleration profiles upon changes in die length or pullback distances and does not even suggest any way of effecting adjustments of the feed roll drive while running. Further, while the Yon apparatus teaches of monitoring of the pull-off drive while running, the pull-off drive of Yon must be both primarily set and adjusted by the operator for each change in die length, velocity, or cumulative error.

In accordance with the present invention, a stored program driven AC servo system for the feed rolls to a web treatment apparatus, such as a rotary die cutter under microprocessor control, readily enables the operator to set and easly change the program to both feed the web material to the web treatment apparatus and to reverse its movement to compensate for differing die lengths both to preserve material and maximize equipment usage. The program may also be modified during operation to make minor adjustments to the pattern length. The stored program driven servo drive is under the direct control of a microprocessor into which the operator need merely input the die length and the desired pullback distance. After entry of these variables, whether before or during operation of the treatment means, the microprocessor computes the appropriate velocity profile and sends it to the stored program position controller which then stores and executes it until a change is mandated by the main microprocessor. The main microprocessor also substantially simultaneously displays the die velocity to the operator and sets the pull-off roll drive speed to maintain the proper supply or slack loop length, all without need for further intervention by the operator. The velocity profiles most suited for each combination of die length and pullback are recomputed and readjusted with each change in any of these factors at the operator's command while a photocell array simultaeously monitors the slack loop and adjusts the pull-off rate speed as required to comply with real time conditions.

With reference now to the drawings, in the FIG. 1 schematic illustration, the web or web material 10 is pulled from a roll 12, mounted on a roll stand 14, under tension by variable speed driven pull or pull-off rolls 16. The web is pulled through a decurl section 18 for removal of the curl. The driving of the pull or pull-off rolls 16 is monitored by photocells 20 in a manner whereby a storage or slack loop 22 is maintained in the web beyond the pull or pull-off rolls 16. The web 10 is drawn from the storage or slack loop 22 through upper and lower feed rolls 24 and 26 with the web 10 subsequently being supplied to the high speed rotary die cutter 28 comprising, for example, an upper die carrying roll or cylinder 30 and a lower anvil roll 32, either rigid or cushioned. Of course, these rolls may be positioned in other physical orientations, such as side-by-side or inverted from the described position.

In the prior art Yon patent apparatus, the cam controlled feed rolls accelerated the web as close as possible to the cutter velocity and then were declutched so that during actual cutting, the web movement through the rotary cutter was effected by the direct pull thereon by the die. Therefore, throughout the period of engagement of the die, the web was necessarily maintained at a velocity equal to the constant peripheral velocity of the die although the depth of the die penetration made this velocity difficult to calculate. In the present method, apparatus and system, it is also apparent that while engaged with the die, the web 10 must necessarily also move generally at the die velocity and this velocity is still not absolutely known, again due to the variation in penetration of the die rule into the rubber anvil roll and the thickness of the web. Experience has shown, however, that the difference appears trivial. Further, the web velocity is much more accurately known in the case of a die cutter in which a hardened steel is used for the anvil roll. Moreover, any inexactness in matchup between trailing and leading edge cuts can be compensated for by varying the amount of pullback while the machine is running.

Another problem more clearly addressed herein is that generally, the part or blank to be cut is not of a length exactly equal to the circumference of the die cylinder of roll 30. Therefore, there will usually be a gap in the die cylinder periphery during which no web material is needed and, in fact, if web material is continued to be fed, it would be wasted. In general, the die tends to pull more material than is required resulting in about 2-3" of scrap between patterns in the case of a closed pattern (a pattern cut completely in one pass of the die) and a pattern which is 2-3" too long in the case of an open pattern (a pattern which is cut as portions of two successive passes).

Figure 2:
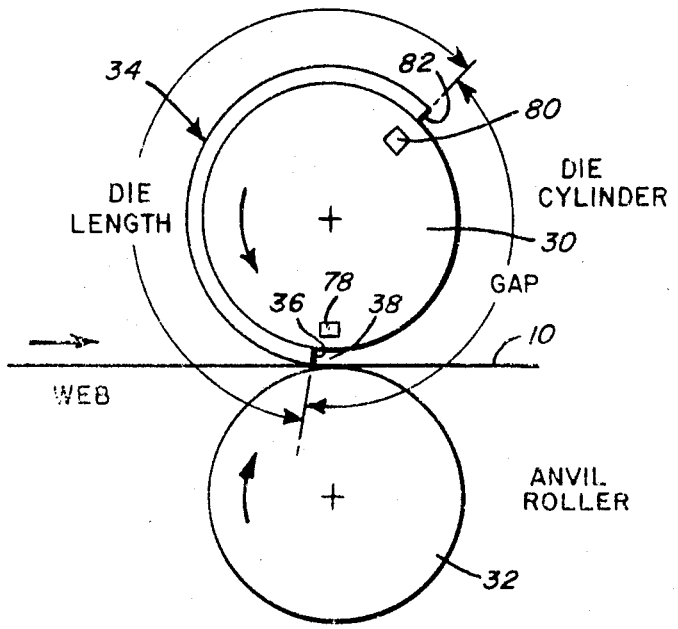
FIG. 2 is a schematic illustration of the treatment rolls as the leading edge of the die engages the web.

Intermittent cuts also could not be made. This can be appreciated from the schematic view of FIG. 2 wherein the die, on the die cylinder 30, has been designated by reference numeral 34 and the leading edge thereof by the reference character 36 defined at the trailing end of a peripheral gap 38.

In the Yon apparatus, the web is driven by the die during engagement therewith and the feed rolls are free-rolling, being declutched at that time from their drive. Also, the feed rolls are cam driven to effect web movement only during the non-cutting portion of the cycle. In the present invention, however, at least one of the feed rolls 24 and 26 is under computer and servo drive control at all times during the cycle. For example, the feed roll 24 may be driven by a stored program driven AC servo drive 40. This system 40 includes a programmable position controller 41, a servo motor drive 43, a servo motor 45, and feedback loops for the servo encoder 47 and tachometer. It also includes its own microprocessor system wherein the velocity profile may be generated and downloaded to be stored in the position controller. The servo drive also includes a position encoder 42 which generates a train of pulses as the drive rotates which is used for feedback servo control and is also available to monitor the feed roll movement. In one embodiment described herein, the feed roll has a diameter of 2.745 inches and the position encoder thereof provides 1000 pulses per revolution of the feed roll. The die cylinder 30 is also provided with a position encoder designated by the reference character 42. In the exemplary embodiment described herein, the die cylinder 30 has a circumference of 66 inches and the encoder 42 provides 10,000 pulses per revolution of the die cylinder 30. The pull rolls 16 feeding the loop 22 are also driven by a variable speed drive 44 also basically under computer control.

Figure 5:
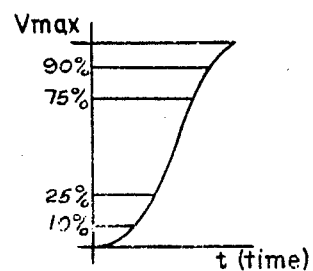
FIG. 5 graphically illustrates an approximation of an acceleration portion of the operating cycle.
Figure 3:
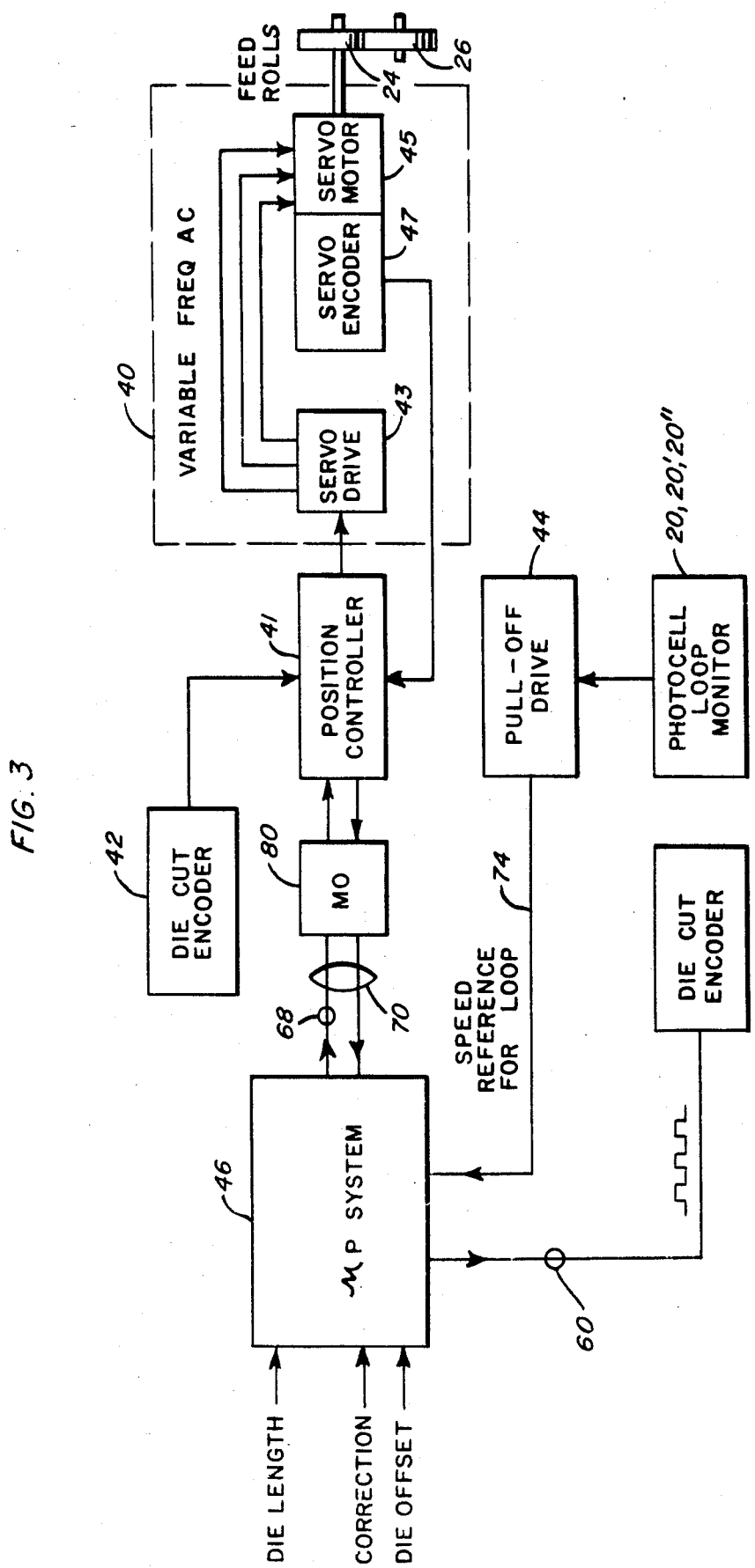
FIG. 3 is a schematic block diagram of the control circuitry of the present invention.
Figure 4:
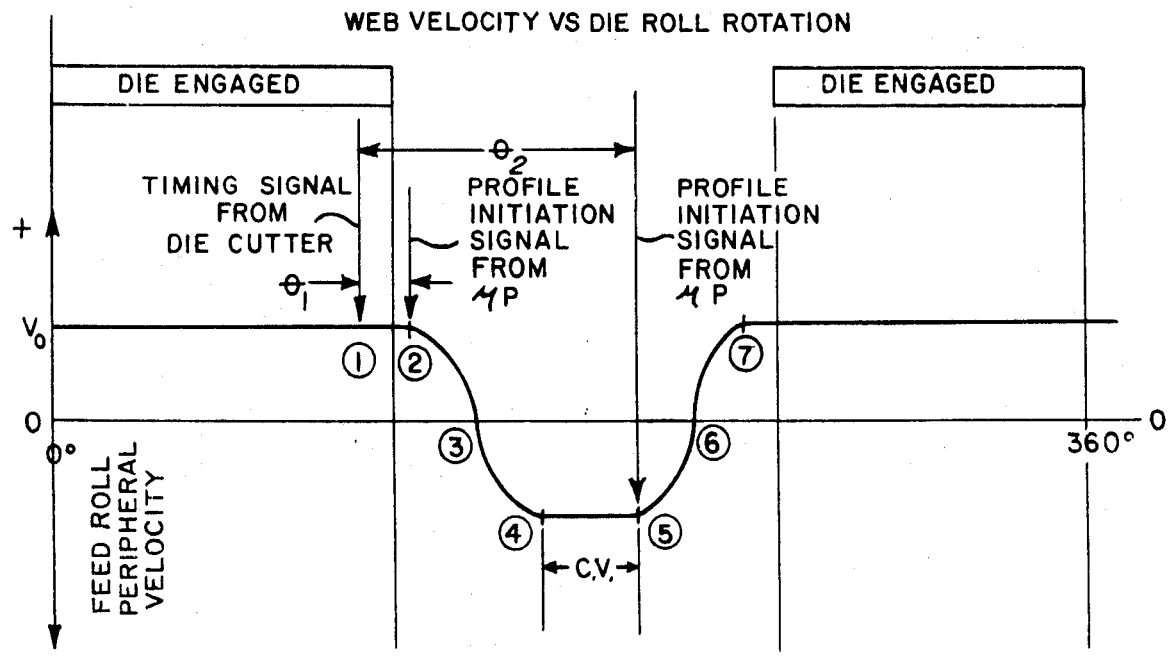
FIG. 4 graphically illustrates a complete operating cycle of the system of the invention.
Figure 7:
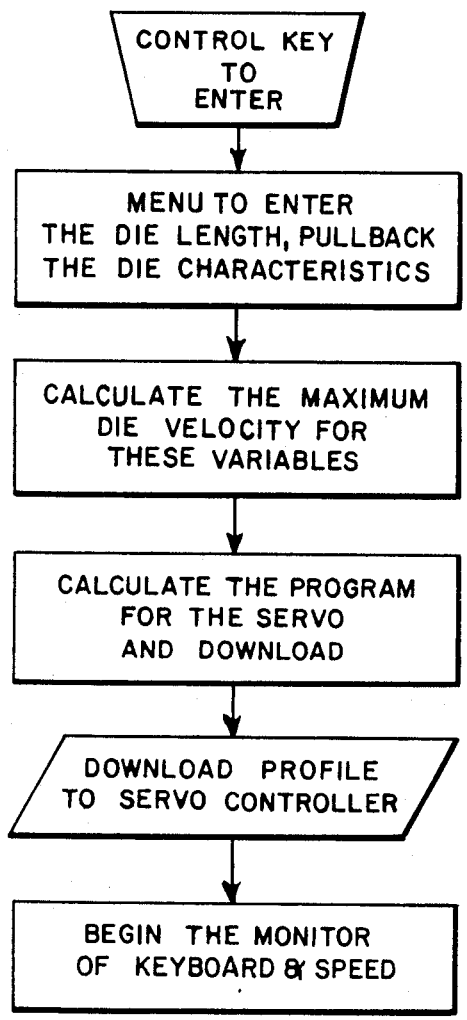
FIG. 7 is a flow chart of the sub-routine used to calculate velocity profile for the feed roll servo control using the microprocessor to enter a new die length and pull back distance.
Figure 8:
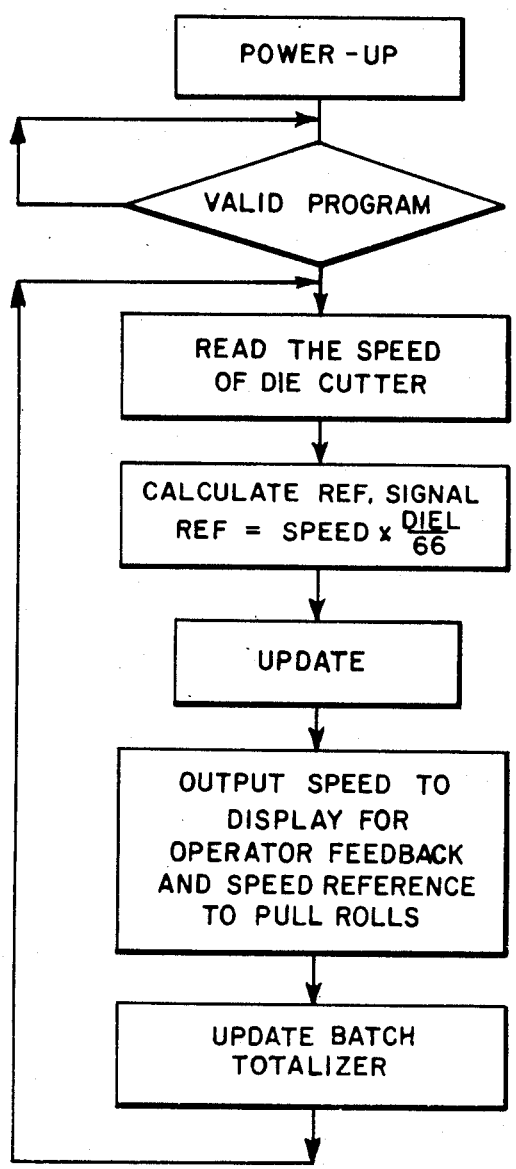
FIG. 8 is a flow chart of the main monitor loop program for the system of the invention.

With reference now to FIG. 3, the overall electrical circuit of the present invention is schematically shown in block diagram form. 46 designates a microprocessor system which executes the procedures outlined in the flow charts of FIGS. 7 and 8 by, for example, using the appended assembly language program to generate the velocity and acceleration profiles for the feed rolls and, therefore, for the web, as shown in FIGS. 4 and 5. As pointed out in more detail elsewhere herein, the processor or personal computer system 46 computes a velocity and acceleration profile for the position controller driven servo drive 40 for at least one of the feed rolls 24 and 26 as required for the inputted die length, correction length and die offset, and downloads the generated velocity profile to the position controller 41 from an input/outoput port 68, as through an RS232 port connector 70. Position controller 41 stores the velocity profile program and continuously outputs to serve drive 43 an analog voltage signal varying from −10 volts to +10 volts at a rate which is governed by the encoder 42 mounted on the die cutter. The stored program is digital in nature and is downloaded once from computer 46 into position controller 41 at the time of set-up. Servo motor 45 is preferably an AC servo which is capable of about 20 horsepower, peak, but may also be DC or hydraulic if more power is desired.

As hereinbefore pointed out, the processor system 46 also generates a speed reference signal for the pull-off or loop feed drive 44 which is downloaded from an output line 74. As has been mentioned, the die cutter requires paper intermittently from the loop while the die is engaged. To maintain synchronization, the feed rolls 24 and 26 likewise intermittently feed the paper web forward at the die speed while the die is engaged. Then, they pull the paper backward and re-accelerate it forwardly while the die is not cutting. The microprocessor 46 controls this. It is, however, also necessary to provide a constant speed drive to pull paper off the supply roll at a relatively steady rate due to the inertia of the paper roll. The slack loop provides a low inertia load to the feed rolls and provides a way to accommodate the constant speed payoff from the supply roll providing constant input into the low inertial loop 22 and intermittent output of paper web therefrom to the feed rolls. In doing this, the bottom of the loop moves up and down as material is respectively taken from the loop 22 when the die is cutting and is replenished to the loop 22 when the die is not. In accordance with the present invention, the microprocessor system 46 also controls feed into the loop 22.

The constant rate at which the pull rolls supply web is defined as:

$$\pi D_P N_P = L \times N_c \text{ (in./min.)}$$

where,
$D_P$=the diameter of the driven pull roll
$N_P$=speed (RPM) of driven pull roll
L=die length (inches)
$N_c$=die cutter speed (RPM)
solving for $N_P$ $$N_p = \frac{LN_c}{\pi D_p}$$

To derive a command signal proportional to $N_P$, a frequency is calculated from a measurement of the die cutter encoder pulse period. The pull roll speed is then calculated digitally using the die length. The digital signal representing the pull roll speed is then converted to an analog signal by the interface board and sent to the pull roll drive as a command signal.

Naturally, some sort of correction system is required to compensate for the fact that any errors in generating the predicted pull roll speed wil accumulate over time and the loop will shorten or lengthen out of the desired operating range. To accomplish this, there is a vertical array of three photocells, each interruptable by the loop in succession (see FIG. 1). The logic equation for increasing or decreasing the pull roll speed an adjustable amount to keep the loop within the desired range is as follows:

Increase=$\overline{20}$ and $\overline{20'}$
Decrease=$\overline{20'}$ and $\overline{20''}$ and an appropriate correction signal is generated when either condition is met. So long as neither condition is met, the pull drive 44 remains at the speed downloaded from the microprocessor system 46. The photocell loop monitor 20—20" therefore also feeds the pull-off drive 44 so that if the loop starts to become too short, the recorded speed reference signal from the processor output 74 is overridden and the loop drive 44 is speeded up by a preset amount to start lengthening the loop.

Similarly, if the loop starts to get too large, the loop drive is slowed.

Reference is now made to FIG. 4, illustrating the desired velocity diagram of the web and feed rolls, wherein one complete operating cycle of the apparatus is illustrated. The horizontal axis marked 0' to 360' represents one complete revolution of the die cylinder or roll and 10,000 pulses from the die position encoder 42. The point at which the web is engaged and moving with the die at die peripheral velocity is designated as 20°.

In order to maintain the computer program synchronized with the die movement, the die cylinder, in addition to the positioning encoder 42 is provided with timing means for generating a timing or trigger pulse once during each revolution of the die cylinder 30 which initializes the computer program and maintains synchronization by avoiding any cumulative drift of the computer programs relative the actual cutting operation by providing feedback of the die position to the computer during each cycle. This time or trigger signal may be generated from a proximity switch 78 (see FIG. 2) and actuating means therefor, such as a magnet 80, carried by the die cylinder 30, adjacent the trailing edge 82 of the die 34. If desired, however, the position encoder signal alone may be used. For example, if die release is known to occur at a count of 8500, the trigger pulse may occur at a count of 9000. As indicated in FIG. 4, this timing signal or trigger pulse may be generated shortly before the trailing edge of the die 34 disengages the web 10, as indicated by the point marked (1) on the velocity profile of FIG. 4 or as stated above, may occur shortly thereafter. After receipt of the trigger pulse or tuning signal after a first time interval "die offset" at point (2) on the velocity profile of FIG. 4, the processor system 46 will initiate a negative changing velocity profile signal to the servo drive to decelerate and then reverse it from points (2) to (4) on the velocity profile of FIG. 4. Then, at a second time interval, point (5) on the velocity profile, after allowing for net pullback and correction length (i.e., between points (4) and (5)) the processor will initiate acceleration, points (5) to (7) on the velocity profile.

In accordance with the present invention, therefore, on each cycle of the die cylinder 30, the following events may occur within the stored program servo drive 40:

(1) Initiation of the deceleration profile (pt. (2) of FIG. 4) after a fixed distance, "die offset", on receipt of an external command sent out once per revolution of the die cutter 34 by the processor 46 following triggering by proximity switch 78. (pt. (2)) This provides synchronization with the die cutter as well as a means for making pattern length adjustments while in operation.

(2) Likewise, initiation of the acceleration profile after a preset distance, "die offset", at pt. (5) an external command from the processor 46. This point is calculated from die offset and pullback which are entered at set-up and downloaded to position controller memory. Software control therefore enbales the amount of net pullback or correction to be varied and the pattern length can be corrected while in operation.

To change the amount of pullback while running, the new value of pullback is entered via the keyboard to the computer 46, a new velocity profile is calculated based on the original die length, original die offset, and the new pullback. The new velocity profile is downloaded into an alternate section of position controller memory and on the next cycle of the die cutter, control is switched to the new profile. In a similar way, the die length and/or die offset can be corrected while running.

The method of changing the velocity profile while the die cutter is running is a very desirable addition made possible by this invention. Specifically, the operator enters new die length, offset or correction information into the microprocessor, it calculates the velocity profile code and downloads it to the alternate memory location in the position controller. When the registration signal from the die cutter encoder starts the new program cycle, it simply starts the new profile instead of the old one. No machine cycles are lost in the process.

The "die offset" is a length of die cutter revolution after receipt of the registration signal which is programmed in to provide an adjustable delay distance before starting into the deceleration profile. The purpose is to provide an adjustable start point for the profile to accommodate variation in the die-to-die drum registration caused by die inaccuracies. The proper value of "die offset" is determined during the initial set-up and probably will remain fixed for that particular die.

(3), (1) and (2) above may, in accordance with the present invention, be practiced in conjunction with recalculation of the acceleration profile according to die length discussed elsewhere herein.

The ability to reprogram the velocity profiles according to die length and to interrupt a running program during the constant velocity (C.V.) and go into a programmed profile gives, among others, the following specific new capabilities not available with the mechanical system described in the Yon patent:

(1) Ability to minimize acceleration rates per RPM so as to run all dies at the same maximum acceleration regardless of die length. This results in running short dies at greater speeds than is possible on long die lengths.

(2) Ability to adjust pattern length while running by entering a new profile into the position controller memory and initiating the new program on the next cycle of the die cutter.

(3) Ability to adjust phase relationship between the die cut and print on the web through modification of the net pullback in one or more cycles so as to effect an adjustment in registration without causing a permanent change in pattern length which would affect subsequent patterns.

(4) Ability to run longer dies than a mechanical system of the same maximum speed capability through the ability to recalculate acceleration rates whereas the mechanical system, with a fixed acceleration/RPM rate, can only accommodate a maximum die length which causes the zero velocity dwell (9-10 of the Yon patent) to be of zero duration. Maximum cam angles and other mechanical considerations limit the maximum die length in a mechanical system to approximately 55".

The present invention has the capability of running products in the die length range 25" to 60" and slightly beyond, when a 66" circumference impression cylinder is utilized, which is the maximum size cylinder that can be run at a reasonable speed. Handling of a 61 to 62" die length may be possible to a crawl.

(5) Ability to fine tune the relationship of the feed roll velocity profile to the position of the die on the die cylinder after a die change has been made. This ability saves set-up time after a die change.

Of course, in FIG. 4, while smooth velocity profiles are shown such as would be produced by an analog system, the digital system of the exemplary embodiment herein disclosed actually produces stepwise approximations of these curves, with the number of steps being dependent on the cycle speed of the die cutter synchronization encoder 42.

With reference now to FIG. 5, the calculation of the velocity profile, acceleration phase will now be discussed. As pointed out hereinbefore, the acceleration and deceleration programs are conveniently computed each in two portions, one on either side of the zero velocity crossovers (pts. (3) and (6)). FIG. 5 corresponds to the zero to-forward-at-maximum velocity profile (pts. (6) to (7)) of FIG. 4.

In one embodiment, as illustrated in FIG. 5 and as executed by the software of the appendix hereto, four intermediate velocities are calculated, at 10%, 25%, 75% and 90% of the maximum velocity (V max) by the processor 46 and downloaded to the servo drive 40. As pointed out above, the die cutter of the exemplary embodiment has a 10,000 line encoder and a 66 inch circumference while the feed roll encoder is 1000 lines and the feed roll circumference is 8.6237 inches. Hence, the die cutter encoder produces 303.03 pulses/inch while the feed roll encoder produces 115.96 pulses/inch. Ratio of these two pulse trains is 115.96/303.03=0.3827. Using the four steps of FIG. 5, the following values result as the factors to be stored in memory and applied to the die velocity and downloaded to the servo drive during each acceleration/deceleration half phase:

| Step | RPM/.3827 |
|------|-----------|
| 90%  | .3444     |
| 75%  | .2870     |
| 25%  | .0957     |
| 10%  | .0383     |

The same factors are applied in reverse order during the alternate half phases.

Figure 6:
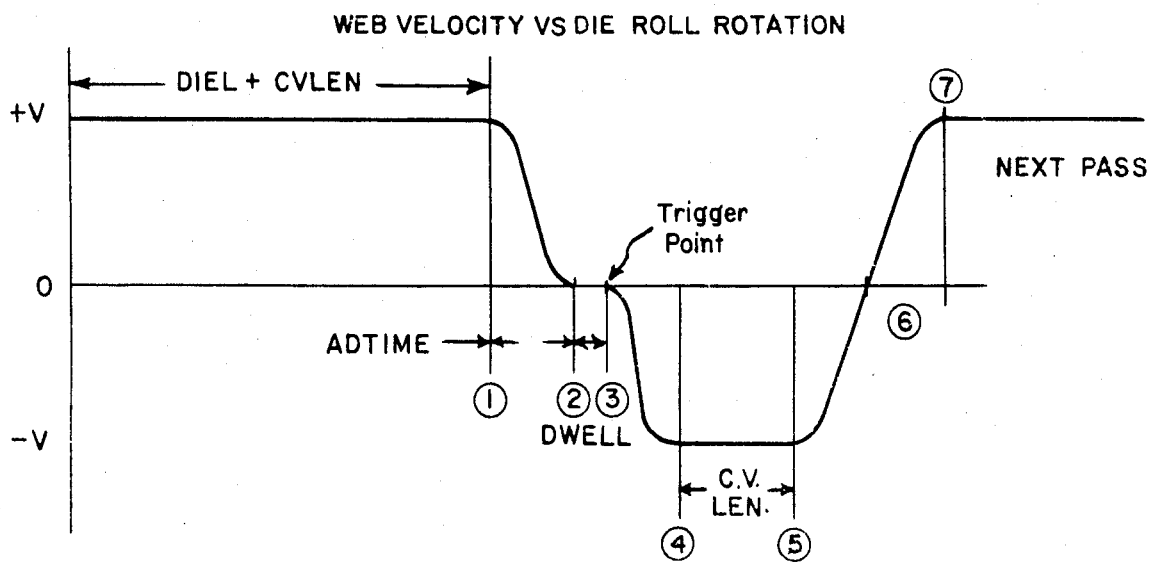
FIG. 6 graphically illustrates an approximation of a complete operating cycle incorporating a short dwell period and useful for an understanding of the invention.

With reference now to FIG. 6, there is shown and illustrated another velocity diagram for the web and feed rolls wherein one complete operating cycle of the apparatus in another operating mode of the present invention is again illustrated. Rather than positioning the proximity switch 78 to provide the trigger pulse (pt. (1) of FIG. 4) before the trailing edge 82 leaves the web, however, the servo program of FIG. 6 is stopped shortly once a cycle at zero velocity (pt. (2)) in order to synchronize the servo with the die and provide a short dwell anticipating the trigger signal from the proximity switch 78 on the die cutter (pt. 3) or a count from the die position encoder. The dwell (pts. (2)–(3)) can be related to die length. For each die, the computer recalculates the program to adjust the rates of acceleration and deceleration to fill the time available for manipulation of the web, i.e., when the die is not engaged with the web as described in connection with FIG. 5. Thus, a short die length has low rates of acceleration and long die lengths may use higher rates of acceleration for a given die cutter RPM.

FIGS. 7 and 8 are flow charts of the sub-routine for calculating the velocity profile to be downloaded to the servo drive upon the operator pressing the ENTER button to generate an interrupt indicating a change in die length and leave the main monitor program loop to service the change.

Figure 9:
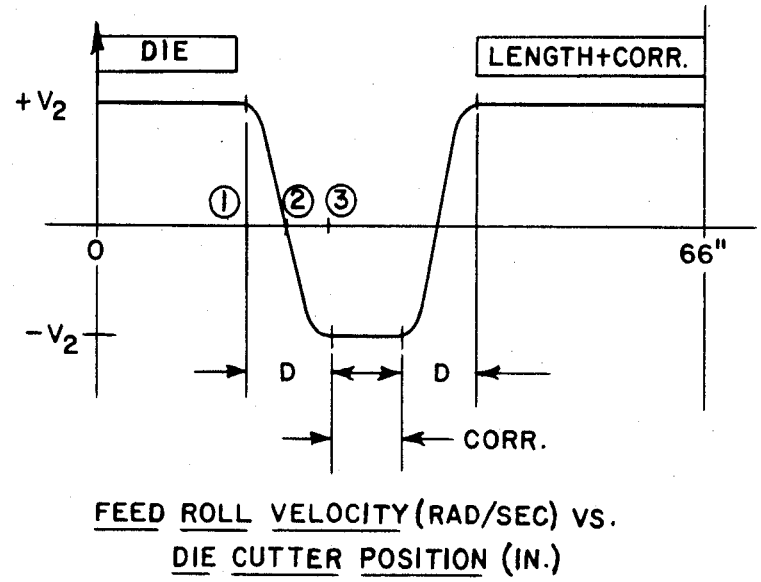
FIGS. 9 and 10 are graphs of alternative forms of operating cycle profiles than those of FIGS. 4 and 6.
Figure 10:
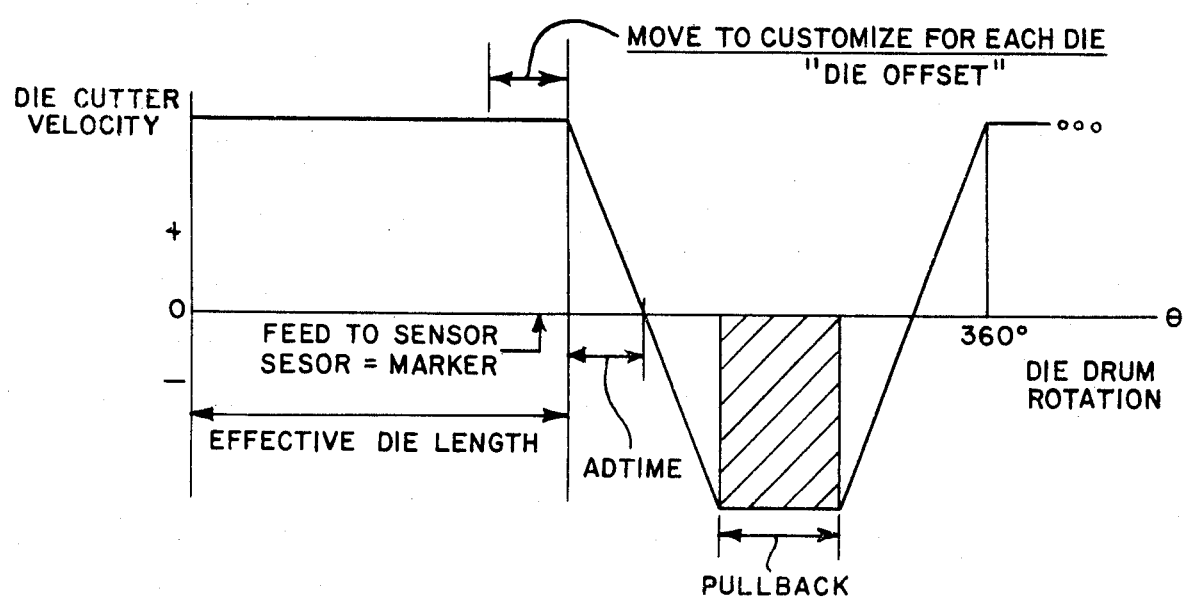

FIGS. 9 and 10 show alternative forms of velocity profiles than those of FIGS. 4 and 6, but using constant acceleration and deceleration curves.

Attached hereto as an appendix is a complete program listing of a program in assembly language of a computer program for practicing the present invention. In that program listing, certain abbreviations are used as descriptors to and in interpretation of the program listing. In FIGS. 6 or 10, the same abbreviations are used. Hence, "DIEL" is used for "die length", "CVLEN" is used for the length of web travel equal to the correction or net pullback from the die nip; and "ADTIME" is used for the feed roll and web movement during each acceleration and deceleration time segment. The remaining abbreviations are believed self-explanatory in light of the foregoing specification and appended drawings.

```
00003                          SECTION ABS, ABSOLUTE
00004
00005      0000                ORG     00H
00006
00007 0000 0009    POINT BLOCK 20H      ;POINTERS FOR 9511 ROUTINES
00008
00009 0009 0009    TMP   BLOCK 05H      ;SCRATCHPAD FOR 9511 APU
00010
00011                          ;  VARIABLES USED IN CALCULATING VELOCITY PROFILES
00012
00013 0012 0002    DIEL  BLOCK 2        ;DIE LENGTH (BINARY)
00014 0014 0003    RSULT BLOCK 3        ;TEMPORARY STORAGE REG.
00015 0017 0002    CVLEN BLOCK 2        ;CV LENGTH THUMBWHEELS
00016 0019 0004    FMAX  BLOCK 4        ;FEED ROLL MAX SPEED (RPM)
00017 001D 0002    DMAX  BLOCK 2        ;DIE CUTTER MAX SPEED (RPM)
00018
00019 001F 0001    VALID BLOCK 1        ;VALID SIGNAL FLAG
00020 0020 0004    CTIME BLOCK 4        ;CYCLE TIME
00021 0024 0002    PULSMX BLOCK 2       ;MAX #PULSES/STEP
00022 0026 0002    PULS2 BLOCK 2        ;PULSMX * 7500
00023 0028 0002    PULS3 BLOCK 2        ;   "    2500
00024
00025 002A 0002    PULS4 BLOCK 2        ;   "    1000
00026 002C 0002    PULDIE BLOCK 2       ;#PULSES/DIE LENGTH
00027 002E 0002    PULCV BLOCK 2        ;#PULSES/NET CV LENGTH
00028
```

```
00029 0030 0002      DBCD   BLOCK   2    ;BCD REP OF DIE LENGTH
00030 0032 0002      CBCD   BLOCK   2    ;BCD REP OF DIE LENGTH
00031 0034 0001      SPCNT  BLOCK   1    ;SPEED UPDATE COUNT REG.
00032 0035 0002      SPEED  BLOCK   2    ;DIE CUT. SPEED HOLDING REG.
00033 0037 0001      DIESET BLOCK   1    ;DIE CUT. SPEED SENT TO DISP
00034
00035                ;      VARIABLES USED IN MISCELLANEOUS SUBROUTINES
00036
00037 0038 0002      AC     BLOCK   2    ;TEMPORARY STORAGE
00038 003A 0002      BC     BLOCK   2    ;       "       "
00039 003C 0002      RSLT   BLOCK   2    ;RESULT REGISTER
00040 003E 0002      INCR   BLOCK   2    ;INC POINTER REGISTER
00041
00042 0040 0001      CT     BLOCK   1    ;REGISTERS USED IN DUTNG SUB
00043 0041 0001      LEAD0  BLOCK   1
00044 0042 0001      COUNT  BLOCK   1
00045
00046 0043 0001      MSB    BLOCK   1    ;BCD TO BINARY CONVERSION
00047 0044 0001      LSB    BLOCK   1    ; ROUTINE REGISTERS
00048
00049 0045 0001      UNTTEN BLOCK   1
00050 0046 0001      HNDTHD BLOCK   1
00051 0047 0001      TENTSD BLOCK   1
00052 0048 0001      SPIKCT BLOCK   1    ;SPIKE CONTROL REG.
00053
00054
00056                ;      *****************************************
00057
00058                ;      DEFINE M68MM22 PIA PORT ADDRESSES
00059
00060                ;      *****************************************
00061
00062      EF00      OPTO1  EQU     0EF00H ;DATA REG A OPTO 22 RACK
00063      EF01      OPTO2  EQU     0EF01H ;  "   "   B (NOT USED)
00064      EF02      OPTOCA EQU     0EF02H ;CONTROL REG A
00065      EF03      OPTOCB EQU     0EF03H ;  "       "   B
00066
00067      EF04      PORT2A EQU     0EF04H ;DATA REG A PORT 2
00068      EF05      PORT2B EQU     0EF05H ;  "   "   B
00069      EF06      PRT2CA EQU     0EF06H ;CONTROL REG A
00070      EF07      PRT2CB EQU     0EF07H ;  "       "   B
00071
00072      EF08      DIELSB EQU     0EF08H ;DATA REG A DIE LENGTH
00073      EF09      DIEMSB EQU     0EF09H ;  "   "   B
00074      EF0A      DIECON EQU     0EF0AH ;CONTROL REG B
00075      EF0B      DCON   EQU     0EF0BH ;  "       "   A
00076
00077      EF0C      CORLSB EQU     0EF0CH ;DATA REG A CORRECTION LENGTH
00078      EF0D      CORMSB EQU     0EF0DH ;  "   "   B
00079      EF0E      CORCON EQU     0EF0EH ;CONTROL REG A
00080      EF0F      CCON   EQU     0EF0FH ;  "       "   B
00081
00082                ;      *****************************************
00083
00084                ;      DEFINE M68MM07 ACIA PORT ADDRESSES
00085
00086                ;      *****************************************
00087
00088      EC20      DISPSR EQU     0EC20H ;DISPLAY STATUS (PORT 1)
00089      EC20      DISPCR EQU     0EC20H ;        CONTROL
00090      EC21      DISPDR EQU     0EC21H ;        DATA
00091
00092      EC24      SERVSR EQU     0EC24H ;SERVO  STATUS  (PORT 3)
00093      EC24      SERVCR EQU     0EC24H ;       CONTROL
00094      EC25      SERVDR EQU     0EC25H ;       DATA
00095
00096                ;      PORTS 2 AND 4 ARE NOT USED AT THIS TIME
00097
```

```
00100        ;    *****************************************
00101
00102        ;         DEFINE 6840(ON MPU BOARD) PTM PORTS
00103
00104        ;    *****************************************
00105
00106  E410  WCR31   EQU   0E410H   ;WRITE CONTROL #3/#1
00107  E411  WCR2    EQU   0E411H   ;  "       "     #2
00108  E412  COUNT1  EQU   0E412H   ;MSB COUNTER #1
00109  E413  T1      EQU   0E413H
00110
00111  E414  COUNT2  EQU   0E414H   ;MSB COUNTER #2
00112  E415  T2      EQU   0E415H
00113  E416  COUNT3  EQU   0E416H   ;MSB COUNTER #3
00114  E417  T3      EQU   0E417H
00115  E411  CSTAT   EQU   WCR2     ;READ E411-STATUS REGISTER
00116        ;    *****************************************
00117
00118        ;       DEFINE CPU BOARD (M68MM01A1B) PIA PORT
00119
00120        ;    *****************************************
00121
00122  E400  LOOP    EQU   0E400H   ;LOOP D/A CONVERTER
00123  E401  LOOPCA  EQU   0E401H
00124  E402  LOOPB   EQU   0E402H
00125  E403  LOOPCB  EQU   0E403H
00126
00128        ;    *****************************************
00129
00130        ;    RESET AND POWER-UP ENTRY POINT. ALL PORTS
00131        ;    ARE RESET UPON ENTRY AT THIS POINT.
00132
00133        ;    *****************************************
00134
00135  F400          ORG   0F400H   ;BEGINNING OF THE EPROM
00136        ;                       PROGRAM
00137
00138        ;    *****************************************
00139
00140        ;         INITIAL 6802 MPU STACK POINTER
00141
00142        ;    *****************************************
00143
00144  F400 8E0078  POWER  LDS   #078H     ;BEGINNING OF STACK
00145
00146        ;    *****************************************
00147
00148        ;         INITIALIZE M68MM22 PIA PORTS
00149
00150        ;    *****************************************
00151
00152
00153  F403 CEF800         LDX   #0F800H ;PORT 1(J1)-OPTO 22 RACK
00154  F406 FFEF00         STX   OPTO1   ;DATA DIRECTION REG
00155  F409 CE0504         LDX   #0504H
00156  F40C FFEF02         STX   OPTOCA  ;CONTROL REG.
00157
00158        ;    SET SERVO TO MANUAL MODE ON POWER UP
00159
00160  F40F 86E0          LDA A  #0E0H    ;ENERGIZE MANUAL RELAY
00161  F411 B7EF00        STA A  OPTO1
00162
00163  F414 FFEF04        STX    PORTEA  ;DATA DIRECTION REG
00164  F417 CE0404        LDX    #0404H
00165  F41A FFEF06        STX    PRTECA  ;CONTROL REG.
00166
00167  F41D CE0000        LDX    #0000H  ;PORT 3(J7) & PORT 4(J9) SAME
00168 F420 FFEF08         STX    DIELSB  ;DATA DIR PORT 3
```

```
00169 F423 FFEF0C        STX    CORLSB   ;DATA DIR PORT 4
00170 F426 CE0404        LDX    #0404H
00171 F429 FFEF0A        STX    DIECON   ;CONTROL REG 3
00172 F42C FFEF0E        STX    CORCON   ;CONTROL REG 4
00174                ;   ***********************************************
00175
00176                ;         INITIALIZE CPU BOARD PIA (6822)
00177
00178                ;   ***********************************************
00179
00180 F42F CEFF04        LDX    #0FF04H  ;INITIAL LOOP PIA
00181 F432 FFE400        STX    LOOP
00182 F435 CE0004        LDX    #0004H
00183 F438 FFE402        STX    LOOPB
00184
00185                ;   INITIAL LOOP CONTROL TO ZERO VOLTS. THE DIE
00186                ;   VELOCITY IS CALCULATED ON THE FIRST PASS
00187                ;   THROUGH THE MONITOR LOOP
00188
00189 F43B 8600         LDA A   #00      ;00= ZERO VOLTS
00190 F43D B7E400       STA A   LOOP
00191
00192                ;   ***********************************************
00193
00194                ;         INITIALIZE 6840 PTM PORTS
00195
00196                ;   ***********************************************
00197
00198 F440 CEFFFF       LDX    #0FFFFH  ;COUNTER LATCHES=FFFF
00199 F443 FFE412       STX    COUNT1
00200 F446 FFE414       STX    COUNT2
00201 F449 FFE416       STX    COUNT3
00202
00203 F44C 8642         LDA A   #42H     ;INITIAL CR 3
00204 F44E B7E410       STA A   WCR31
00205 F451 864B         LDA A   #4BH     ;INITIAL CR 2
00206 F453 B7E411       STA A   WCR2
00207 F456 866A         LDA A   #6AH     ;INITIAL CR 1
00208 F458 B7E410       STA A   WCR31
00209
00210                ;   ***********************************************
00211
00212                ;   INITIAL 6850-ACIA PORTS FOR RS-232C COMMUNICATE
00213
00214                ;   ***********************************************
00215
00216 F45B 8621         LDA A   #21H     ;INITIAL DISPLAY PORT
00217 F45D B7EC20       STA A   DISPCR
00218
00219 F460 8621         LDA A   #21H     ;INITIAL SERVO PORT
00220 F462 B7EC24       STA A   SERVCR
00222                ;   ***********************************************
00223
00224                ;   ALL PORTS INITIALIZED -BEGINNING OF THE MAIN
00225                ;   MONITOR LOOP.
00226
00227                ;   ***********************************************
00228
00229 F465 860D         LDA A   #0DH     ;CR CLEARS THE DISPLAY
00230 F467 BDF60F       JSR     OUCHDS
00231
00232 F46A CEFCC8       LDX     #GREET   ;GREETING MESSAGE
00233 F46D BDF6D1       JSR     OUSTDS
00234 F470 BDF740       JSR     TMD      ;2 SEC DELAY
00235
00236                ;   RESET THE VALID SIGNAL TO OFF
00237                ;   CLEAR THE SPEED COUNT REG-SPCNT,DIESET,VALID
00238
00239 F473 8600         LDA A   #00      ;CLEAR SPCNT,VALID,DIESET
```

```
00240  F475 9734            STA A    SPCNT      ;SPIKCT
00241  F477 971F            STA A    VALID
00242  F479 9737            STA A    DIESET
00243  F47B 9748            STA A    SPIKCT
00244
00245                   ;   SET THE POINTERS FOR THE APU PROGRAM
00246
00247  F47D CE0009          LDX      #TA1       ;POINTER 1
00248  F480 FF0000          STX      TABLE1
00249  F483 CE000B          LDX      #TA1+2     ;POINTER 2
00250  F486 FF0002          STX      TABLE1+2
00251  F489 CE000D          LDX      #TA1+4     ;POINTER 3
00252  F48C FF0004          STX      TABLE1+4
00253
00254  F48F 8669            LDA A    #69H       ;SET DMAX TO MAX FOR START-UP
00255  F491 971E            STA A    DMAX+1
00256
00257  F493 B6E411   MONTOR LDA A    CSTAT      ;READ STATUS REGISTER
00258
00259  F496 FEE414          LDX      COUNT2     ;READ COUNT AND RESET
00260  F499 DF0B            STX      TA1+2      ;STORE 6 TIMES FOR TIME DELAY
00261  F49B DF0B            STX      TA1+2
00262  F49D DF0B            STX      TA1+2
00263  F49F DF0B            STX      TA1+2
00264  F4A1 DF0B            STX      TA1+2
00265  F4A3 DF0B            STX      TA1+2
00266
00267  F4A5 7C0048          INC      SPIKCT     ;INC SPIKE CONTROL
00268  F4A8 D648            LDA B    SPIKCT
00269  F4AA C1FA            CMP B    #0FAH
00270
00271  F4AC 260A            BNE      MONTSP     ;CONTINUE
00272  F4AE 7F0048          CLR      SPIKCT
00273  F4B1 8600            LDA A    #00H
00274  F4B3 B7E400          STA A    LOOP
00275  F4B6 20DB            BRA      MONTOR
00276
00277  F4B8 8402     MONTSP AND A    #02H       ;CHECK FOR PERIOD COMPLETION
00278  F4BA 27D7            BEQ      MONTOR     ; NO, CONTINUE MONITOR
00279
00280                   ;   CHECK FOR SPEED IN RANGE (LOW)
00281
00282  F4BC 8C00FF          CPX      #00FFH     ;SPEED LOW
00283  F4BF 2AD2            BPL      MONTOR
00284                   ;********************************************
00285
00286
00287                   ;   PERIOD COMPLETED, CALCULATED SPEED
00288                   ;   EQUATION- SPEED= 10,000/((FFFF-COUNT2)*.6400)
00289
00290                   ;********************************************
00291
00292  F4C1 CE0009          LDX      #TA1
00293  F4C4 FF0000          STX      TABLE1     ;SET TABLE1 POINTER
00294  F4C7 CE000B          LDX      #TA1+2
00295  F4CA FF0002          STX      TABLE1+2   ;SET TABLE1+2 POINTER
00296  F4CD CE000D          LDX      #TA1+4
00297  F4D0 FF0004          STX      TABLE1+4   ;SET TABLE1+4 POINTER
00298
00299  F4D3 CEFFFF          LDX      #0FFFFH    ;FFFF-COUNT2
00300  F4D6 DF09            STX      TA1
00301  F4D8 8689            LDA A    #89H       ; 1 0 00 10 01
00302  F4DA C66D            LDA B    #SSUB      ;         R  A  B
00303  F4DC BDF5C1          JSR      ARTH2
00304
00305  F4DF 8680            LDA A    #80H       ;CONVERT RSULT TO FLOAT
00306  F4E1 C61D            LDA B    #FLTS
00307  F4E3 BDF5C1          JSR      ARTH2
00308
00309  F4E6 CE00A3          LDX      #00A3H     ;PLACE .6400 ON STACK
```

```
00310 F4E9 DF09              STX     TA1
00311 F4EB CED700            LDX     #0D700H
00312 F4EE DF0B              STX     TA1+2
00313 F4F0 8606               LDA A   #06H
00314 F4F2 BDF5C1            JSR     ARTH2
00315
00316 F4F5 8680              LDA A   #80H        ;MULT TOS * NOS
00317 F4F7 C612              LDA B   #FMUL
00318 F4F9 BDF5C1            JSR     ARTH2
00319
00320 F4FC CE2710            LDX     #2710H      ;CONVERT 10,000 TO FLOAT
00321 F4FF DF09              STX     TA1
00322 F501 8681              LDA A   #81H        ; 1 0 00 00 01
00323 F503 C61D              LDA B   #FLTS       ;     R  A  B
00324 F505 BDF5C1            JSR     ARTH2
00325
00326 F508 8680              LDA A   #80H        ;EXCHANGE OPERANDS
00327 F50A C619              LDA B   #XCHF
00328 F50C BDF5C1            JSR     ARTH2
00329
00330 F50F 8680              LDA A   #80H        ;10,000/TOS
00331 F511 C613              LDA B   #FDIV
00332 F513 BDF5C1            JSR     ARTH2
00333
00334                    ;   CONVERT AND SAVE SPEED FOR UPDATING THE DISPLAY
00335
00336 F516 8680              LDA A   #80H        ;PUSH TOS FOR FUTURE CALC
00337 F518 C617              LDA B   #PTOF
00338 F51A BDF5C1            JSR     ARTH2
00339
00340 F51D 8690              LDA A   #90H        ;CONVERT TOS TO FIXED
00341 F51F C61F              LDA B   #FIXS
00342 F521 BDF5C1            JSR     ARTH2
00343
00344 F524 DE09              LDX     TA1         ;STORE RESULT IN SPEED
00345 F526 DF35              STX     SPEED
00346
00347                    ;   RPM ON TOS, SPEED SIGNAL IS PROPORTIONAL TO THE
00348                    ;   RATIO OF THE DIE LENGTH AND THE DIE DRUM CIRC.
00349
00350                    ;       EQUATION -( DIE LENGTH/6600 )* RPM
00351
00352
00353 F528 DE12              LDX     DIEL        ;CONVERT DIEL TO FLOAT
00354 F52A DF09              STX     TA1
00355 F52C 8681              LDA A   #81H        ; 1 0 00 00 01
00356 F52E C61D              LDA B   #FLTS       ;     R  A  B
00357 F530 BDF5C1            JSR     ARTH2
00358
00359 F533 CE19C8            LDX     #019C8H     ;CONVERT 6600 TO FLOAT
00360 F536 DF09              STX     TA1
00361 F538 8681              LDA A   #81H        ; 1 0 00 00 01
00362 F53A C61D              LDA B   #FLTS       ;     R  A  B
00363 F53C BDF5C1            JSR     ARTH2
00364
00365 F53F 8680              LDA A   #80H        ;DIEL/6600 = TOS
00366 F541 C613              LDA B   #FDIV
00367 F543 BDF5C1            JSR     ARTH2
00368
00369 F546 8680              LDA A   #80H        ;TOS * NOS(RPM)
00370 F548 C612              LDA B   #FMUL
00371 F54A BDF5C1            JSR     ARTH2
00372
00373 F54D 8690              LDA A   #90H        ;CONVERT TOS TO FIXED
00374 F54F C61F              LDA B   #FIXS
00375 F551 BDF5C1            JSR     ARTH2
00376
00377 F554 960A              LDA A   TA1+1       ;DOUBLE THE SPEED
```

```
00378 F556 D60A              LDA B    TA1+1
00379 F558 1B                ABA
00380 F559 B7E400            STA A    LOOP     ;OUTPUT SPEED SIGNAL TO D/A
00381
00382                    ;   OUTPUT SPEED TO THE DISPLAY EVERY 16 CYCLES
00383                    ;   THRU THE MONTOR LOOP, CHECK FOR OVER SPEED
00384                    ;   ON EVERY LOOP THRU.
00385
00386 F55C 961E              LDA A    DMAX+1   ;CHECK FOR OVERSPEED
00387 F55E 9136              CMP A    SPEED+1
00388 F560 2E10              BGT      MONT2    ;NO, CHECK FOR SPCNT = 05
00389
00390 F562 860D              LDA A    #0DH     ;CLEAR DISPLAY WITH CR
00391 F564 BDF68F             JSR      OUCHDS
00392 F567 CEFD46            LDX      #MAXSP   ;OUTPUT MAX SPEED EXCEEDED
00393 F56A BDF6B1            JSR      OUSTDS
00394 F56D 7F0037            CLR      DIESET
00395
00396 F570 204A              BRA      MONT1    ;READ SPEED AGAIN
00397
00398 F572 9634       MONT2  LDA A    SPCNT    ;INC SPEED COUNT
00399 F574 4C                INC A
00400 F575 9734              STA A    SPCNT
00401 F577 8105              CMP A    #05H     ;SPCNT = 05 ?
00402 F579 2641              BNE      MONT1    ; NO, READ SPEED AGAIN
00403
00404                    ;   CHECK IF THE SPEED HAS ALREADY BEEN SENT TO
00405                    ;   TO THE DISPLAY, THEN SEND SPEED TO DISPLAY
00406
00407 F57B 7F0034            CLR      SPCNT    ;CLEAR SPCNT FOR NEXT UPDATE
00408
00409 F57E 9637              LDA A    DIESET   ;HAS SPEED BEEN SENT BEFORE
00410 F580 8100              CMP A    #00H
00411 F582 260F              BNE      MONT3    ; YES, SPEED ONLY TO DISPLAY
00412
00413 F584 860D              LDA A    #0DH     ;CR CLEARS THE DISPLAY
00414 F586 BDF68F            JSR      OUCHDS
00415
00416 F589 CEFD2A            LDX      #DIECUT  ;DIE CUTTER SPEED IS
00417 F58C BDF6B1            JSR      OUSTDS
00418 F58F 86FF              LDA A    #0FFH    ;SET THE DIESET REGISTER
00419 F591 9737              STA A    DIESET
00420
00421                    ;   CONVERT SPEED TO BCD AND THEN TO ASCII
00422
00423 F593 8608       MONT3  LDA A    #08H     ;BACKSPACE 4 TIMES
00424 F595 BDF68F            JSR      OUCHDS
00425 F598 8608              LDA A    #08H
00426 F59A BDF68F            JSR      OUCHDS
00427 F59D 8608              LDA A    #08H
00428 F59F BDF68F            JSR      OUCHDS
00429 F5A2 8608              LDA A    #08H
00430 F5A4 BDF68F            JSR      OUCHDS
00431
00432 F5A7 DE35              LDX      SPEED    ;READ SPEED REG
00433 F5A9 DF43              STX      MSB
00434 F5AB BDF6EA            JSR      BINBC    ;CONVERT TO BCD
00435 F5AE 9646              LDA A    HNDTHD
00436 F5B0 D645              LDA B    UNTTEN
00437 F5B2 9735              STA A    SPEED
00438 F5B4 D736              STA B    SPEED+1
00439 F5B6 CE0035            LDX      #SPEED
00440 F5B9 BDF74C            JSR      OUTND    ;SUB. TO OUTPUT NO. TO DISPLAY
00441 F5BC 7EF493     MONT1  JMP      MONTOR   ;READ SPEED AGAIN
00443                    ;**********************************************
00444
00445                    ;                 THE 9511
00446                    ;
00447                    ;**********************************************
```

```
00448          ;
00449          ;  ENTRY CONDITION
00450          ;
00451          ;  TABLE1    - POINTS TO BUFFER AREA 1
00452          ;
00453          ;  TABLE1+2  - POINTS TO BUFFER AREA 2
00454          ;
00455          ;  TABLE1+4  - POINTS TO BUFFER AREA 3
00456          ;
00457          ;
00458          ;  THE MPU A REGISTER SPECIFIES SOURCE AND
00459          ;  DESTINATION AREAS AS DEFINED BELOW
00460          ;
00461          ;  A REGISTER BITS
00462          ;
00463          ;  C S R  A  B
00464          ;  7 6 54 32 10
00465          ;
00466          ;  X X XX XX 00  NO B SOURCE REGISTER
00467          ;           01   SOURCE = 1
00468          ;           10   SOURCE = 2
00469          ;           11   SOURCE = 3
00470          ;
00471          ;  X X XX 00 XX  NO A SOURCE REGISTER
00472          ;        01      SOURCE = 1
00473          ;        10      SOURCE = 2
00474          ;        11      SOURCE = 3
00475          ;
00476          ;  X X 00 XX XX  RESULT STAYS ON APU STACK
00477          ;     01         DESTINATION = 1
00478          ;     10         DESTINATION = 2
00479          ;     11         DESTINATION = 3
00480          ;
00481          ;  0 0 XX XX XX  NO COMMAND, 16 BITS
00482          ;  0 1 XX XX XX  NO COMMAND, 32 BITS
00483          ;  1 X XX XX XX  DO COMMAND, SIZE IMPLIED
00484          ;
00485          ;  WHEN A COMMAND IS SPECIFIED THE SIZE OF THE
00486          ;  NUMBERS IS IMPLIED. IF A COMMAND IS NOT
00487          ;  SPECIFIED, THEN THE SIZE OF THE NUMBERS MUST
00488          ;  BE SPECIFIED IN BIT 6.  IF THE COMMAND IS A
00489          ;  NOP, NO SIZE CAN BE IMPLIED AND SIZE MUST BE
00490          ;  SPECIFIED.
00491          ;
00492          ;  WHEN A AND B ARE BOTH SPECIFIED, B IS PUSHED
00493          ;  ON THE STACK FIRST. (TOS=A, NOS=B)
00494          ;
00495          ;  ORDER: SUBTRACTION   B-A=R
00496          ;  ORDER: DIVISION      B/A=R
00497          ;
00498          ;  THE MPU B REG SPECIFIES THE APU
00499          ;
00500          ;  EXIT CONDITIONS
00501          ;       CARRY SET IF ERROR, CLEAR IF NO ERROR
00502          ;       THE MPU BIT B REGISTER CONTAINS THE APU
00503          ;       STATUS CODE
00504          ;
00505          ;  STATUS CODES
00506          ;   BIT 6=1 NEGATIVE
00507          ;   BIT 5=1 ZERO
00508          ;   BIT 4321
00509          ;       0000 = NO ERROR
00510          ;       1000 = DIVIDE BY ZERO
00511          ;       0100 = SQRT OR LOG NEGATIVE NUMBER
00512          ;       1100 = ARGUMENT TOO LARGE
00513          ;       XX10 = UNDERFLOW
00514          ;       XX01 = OVERFLOW
00515          ;   BIT 0=CARRY OR BORROW
00516          ;
```

```
00517                        ;     CONTROL REGISTER DEFINITION
00518                        ;
00519                        ;     BIT                    DEFINITION
00520                        ;
00521                        ;      7      BUSY  - APU BUSY(CBUSY - RESET - PBUSY)
00522                        ;      6      SVQR  - INTERUPT REQUEST ACTIVE
00523                        ;      5      CBUSY - COMMAND INITIATED BUSY
00524                        ;      4      RESET - RESET INITIATED BUSY
00525                        ;      3      PBUSY - READ INITIATED BUSY
00526                        ;      2      END   - OPERATION COMPLETES STROBE
00527                        ;      1      UNDEFINED
00528                        ;      0      UNDEFINED
00529                        ;
00531                        ;     ******************************************
00532
00533                        ;     16 BIT FIXED_POINT OPERATIONS
00534
00535    006C      SADD    EQU    6CH      ;SINGLE ADD
00536    006D      SSUB    EQU    6DH      ;SINGLE SUBTRACT
00537    006E      SMUL    EQU    6EH      ;SINGLE MULTIPLY LOWER
00538    0076      SMUU    EQU    76H      ;SINGLE MULTIPLY UPPER
00539    006F      SDIV    EQU    6FH      ;SINGLE DIVIDE
00540                        ;     32 - BIT FIXED POINT OPERATIONS
00541    002C      DADD    EQU    2CH      ;DOUBLE ADD
00542    002D      DSUB    EQU    2DH      ;DOUBLE SUBTRACT
00543    002E      DMUL    EQU    2EH      ;DOUBLE MULTIPLY LOWER
00544    0036      DMUU    EQU    36H      ;DOUBLE MULTIPLY UPPER
00545    002F      DDIV    EQU    2FH      ;DOUBLE DIVIDE
00546                        ;     FLOATING POINT PRIMARY OPERATIONS
00547    0010      FADD    EQU    10H      ;FLOATING ADD
00548    0011      FSUB    EQU    11H      ;FLOATING SUBTRACT
00549    0012      FMUL    EQU    12H      ;FLOATING MULTIPLY
00550    0013      FDIV    EQU    13H      ;FLOATING DIVIDE
00551                        ;     FLOATING POINT DERIVED OPERATIONS
00552    0001      SQRT    EQU    01H      ;SQUARE ROOT
00553    0002      SIN     EQU    02H      ;SINE
00554    0003      COS     EQU    03H      ;COSINE
00555    0004      TAN     EQU    04H      ;TANGENT
00556    0005      ASIN    EQU    05H      ;ARC SINE
00557    0006      ACOS    EQU    06H      ;ARC COSINE
00558    0007      ATAN    EQU    07H      ;ARC TANGENT
00559    0008      LOG     EQU    08H      ;COMMON LOG
00560    0009      LN      EQU    09H      ;NATURAL LOG
00561    000A      EXP     EQU    0AH      ;E TO THE X
00562    000B      PWR     EQU    0BH      ;POWER (NOS TO THE TOS)
00563                        ;     DATA STACK MANIPULATION OPERATIONS
00564    0000      NOPP    EQU    0        ;NO OPERATION
00565    001F      FIXS    EQU    1FH      ;FIX SINGLE
00566    001E      FIXD    EQU    1EH      ;FIX DOUBLE
00567    001D      FLTS    EQU    1DH      ;FLOAT SINGLE
00568    001C      FLTD    EQU    1CH      ;FLOAT DOUBLE
00569    0074      CHSS    EQU    74H      ;CHANGE SIGN SINGLE
00570    0034      CHSD    EQU    34H      ;CHANGE SIGN DOUBLE
00571    0015      CHSF    EQU    15H      ;CHANGE SIGN FLOAT
00572    0077      PTOS    EQU    77H      ;PUSH STACK SINGLE
00573    0037      PTOD    EQU    37H      ;PUSH STACK DOUBLE
00574    0017      PTOF    EQU    17H      ;PUSH STACK FLOAT
00575    0078      POPS    EQU    78H      ;POP STACK SINGLE
00576    0038      POPD    EQU    38H      ;POP STACK DOUBLE
00577    0018      POPF    EQU    18H      ;POP STACK FLOAT
00578    0079      XCHS    EQU    79H      ;EXCHANGE OPERANDS SINGLE
00579    0039      XCHD    EQU    39H      ;EXCHANGE OPERANDS DOUBLE
00580    0019      XCHF    EQU    19H      ;EXCHANGE OPERANDS FLOAT
00581    001A      PUPI    EQU    1AH      ;PUSH PI
00582    EC30      ORGB    EQU    0EC30H
00583    EC30      DATAA   EQU    ORGB
00584    EC31      STATUS  EQU    ORGB+1
00585    EC31      CMDA    EQU    ORGB+1
00586    EC32      CTRL    EQU    ORGB+2
```

```
00587   EC32            RST     EQU     ORGB+2
00588   EC33            RDATA   EQU     ORGB+3
00589   0000            TABLE1  EQU     00H
00590           ;       ************************************************
00591
00592           ;       ENTRY THROUGH THIS POINT WILL CAUSE AN
00593           ;       INTERUPT TO BE GENERATED WHEN THE APU
00594           ;       FINISHES A COMMAND. THE USER MUST PROVIDE A
00595           ;       ROUTINE TO HANDLE THIS INTERUPT. IF INTERUPTS
00596           ;       ARE ENABLED, NO RESULT OR STATUS IS RETURNED.
00597           ;       THE ROUTINE EXITS AFTER THE COMMAND IS ISSUED
00598           ;       TO THE APU.
00599
00600   F5BF CA80       ARTH1   ORA B   #80H    ;OR IN BIT 7 TO GENERATE IRQ
00601
00602           ;       NORMAL ENTRY
00603   F5C1 37         ARTH2   PSH B           ;CMD - MPU STACK
00604   F5C2 36                 PSH A           ;OPC - MPU STACK
00605   F5C3 8403               AND A   #03H    ;AR = 0 NO B VALUE
00606   F5C5 2709               BEQ     AR10
00607   F5C7 CE0000             LDX     #TABLE1
00608   F5CA 8D56               BSR     ADAX    ;ADD OFFSET TO XR
00609   F5CC 32                 PUL A           ;OPC - AR+STACK
00610   F5CD 36                 PSH A
00611   F5CE 8D34               BSR     PUSH10  ;PUSH B VALUE TO APU STACK
00612
00613   F5D0 32         AR10    PUL A           ;OPC - A+STACK
00614   F5D1 33                 PUL B           ;CMD - B+STACK
00615   F5D2 37                 PSH B
00616   F5D3 36                 PSH A
00617   F5D4 44                 LSR A
00618   F5D5 44                 LSR A
00619   F5D6 8403               AND A   #3      ;AR=0 NO A VALUE
00620   F5D8 2709               BEQ     AR20
00621   F5DA CE0000             LDX     #TABLE1
00622   F5DD 8D43               BSR     ADAX    ;ADD OFFSET TO XR
00623   F5DF 32                 PUL A           ;OPC - AR+STACK
00624   F5E0 36                 PSH A
00625   F5E1 8D21               BSR     PUSH10  ;PUSH A VALUE TO APU STACK
00626
00627   F5E3 32         AR20    PUL A           ;OPC - AR+STACK
00628   F5E4 33                 PUL B           ;CMD - BR
00629   F5E5 37                 PSH B
00630   F5E6 36                 PSH A
00631   F5E7 4D                 TST A           ;AR POS NO COMMAND
00632   F5E8 2A04               BPL     AR30
00633   F5EA 8D44               BSR     WCMD    ;EXECUTE COMMAND
00634           ;                               IF CMD ENABLES INTERUPTS
00635   F5EC 2B13               BMI     AR50    ;THEN CLEAR STACK AND EXIT
00636   F5EE 44         AR30    LSR A
00637   F5EF 44                 LSR A
00638   F5F0 44                 LSR A
00639   F5F1 44                 LSR A
00640   F5F2 8403               AND A   #3      ;AR=0 RESULT STAYS ON STACK
00641   F5F4 2709               BEQ     AR40
00642   F5F6 CE0000             LDX     #TABLE1
00643   F5F9 8D27               BSR     ADAX    ;ADD OFFSET TO XR
00644   F5FB 32                 PUL A           ;OPC - AR+STACK
00645   F5FC 36                 PSH A
00646   F5FD 8D14               BSR     PULL10  ;PULL RESULT FROM STACK
00647           ;
00648   F5FF 8D35       AR40    BSR     RSTAT   ;STATUS - BR, CARRY SET IF ERR
00649   F601 32         AR50    PUL A           ;CLEAR STACK
00650   F602 32                 PUL A
00651   F603 39                 RTS
00652
00653           ;       ************************************************
00654
00655           ;               SUBROUTINES FOR APU 9511
00656
```

```
00657                    ;   *********************************************
00658
00659 F604 EE00   PUSH10  LDX     0,X         ;GET POINTER
00660 F606 5D             TST B
00661 F607 2704           BEQ     PSH20       ;SPECIAL TEST FOR NOP
00662 F609 8580           BIT A   #80H
00663 F60B 264E           BNE     DPUSHA      ;CMD = 1 AUTO PUSH, UNLESS NOP
00664 F60D 8540   PSH20   BIT A   #40H
00665 F60F 2754           BEQ     DPUSH2      ;CMD=0,SIZE=0,PUSH 2 BYTES
00666 F611 2058           BRA     DPUSH4      ;CMD=0,SIZE=1,PUSH 4 BYTES
00667
00668 F613 EE00   PULL10  LDX     0,X         ;GET POINTER
00669 F615 5D             TST B
00670 F616 2704           BEQ     PUL20       ;SPECIAL TEST FOR NOP
00671 F618 8580           BIT A   #80H
00672 F61A 265A           BNE     DPULLA      ;CMD=1,AUTO PULL,UNLESS NOP
00673 F61C 8540   PUL20   BIT A   #40H
00674 F61E 2760           BEQ     DPULL2      ;CMD=0,SIZE=0,PULL 2 BYTES
00675 F620 2062           BRA     DPULL4      ;CMD=0,SIZE=1,PULL 4 BYTES
00676
00677 F622 4A     ADAX    DEC A               ;ADD (AR-1)*2 TO XR
00678 F623 2704           BEQ     RET
00679 F625 08             INX
00680 F626 08             INX
00681 F627 20F9           BRA     ADAX
00682 F629 39     RET     RTS
00683
00684                    ;   WAIT FOR APU IDLE
00685
00686 F62A 7DEC32 APUIDL  TST     CTRL
00687 F62D 2BFB           BMI     APUIDL
00688 F62F 39             RTS
00690
00691                    ;   *********************************************
00692                    ;   WRITE COMMAND SUBROUTINE
00693                    ;
00694                    ;   THE WCMD ROUTINE TRANSFERS A COMMAND FROM THE
00695                    ;   MPU B REG TO THE APU COMMAND REG AND STARTS
00696                    ;   THE APU.
00697                    ;   *********************************************
00698
00699 F630 8DF8   WCMD    BSR     APUIDL      ;WAIT FOR APU IDLE CONDITION
00700 F632 F7EC31         STA B   CMDA        ;WRITE COMMAND TO APU
00701 F635 39             RTS
00702
00703                    ;   *********************************************
00704                    ;   READ STATUS SUBROUTINE
00705                    ;
00706                    ;   THE RSTAT ROUTINE TRANSFERS THE APU STATUS REG
00707                    ;   TO THE MPU B REG.  THIS ROUTINE RETURNS WITH
00708                    ;   THE CARRY SET IF AN ERROR OCCURED DURING THE
00709                    ;   LAST APU OPERATION. THE CARRY IS CLEARED IF NO
00710                    ;   ERRORS HAVE OCCURED.
00711                    ;   *********************************************
00712
00713 F636 8DF2   RSTAT   BSR     APUIDL      ;WAIT FOR IDLE
00714 F638 F6EC31         LDA B   STATUS      ;START STATUS READ
00715 F63B 01             NOP                 ;WAIT MANDATORY X CYCLES FOR
00716                    ;                    APU
00717 F63C 01             NOP
00718 F63D 01             NOP
00719 F63E F6EC33         LDA B   RDATA       ;READ STATUS
00720 F641 17             TBA
00721 F642 841E           AND A   #1EH
00722 F644 0C             CLC
00723 F645 2701           BEQ     RST10
00724 F647 0D             SEC
00725 F648 39     RST10   RTS
00726
```

```
00727                    ;    ****************************************************
00728                    ;    NO DATA WRITE SUBROUTINE
00729                    ;
00730                    ;    THE NO DATA WRITE SUBROUTINE TRANSFERS ONE
00731                    ;    BYTE FROM THE MPU B REG TO THE APU STACK
00732                    ;    ****************************************************
00733
00734 F649 8DDF    DWRITE BSR      APUIDL  ;WAIT FOR APU IDLE STATE
00735 F64B F7EC30         STA B    DATAA   ;WRITE DATA
00736 F64E 39             RTS
00737
00738
00739
00740                    ;    ****************************************************
00741                    ;    DATA READ SUBROUTINE
00742                    ;
00743                    ;    THE DREAD ROUTINE TRANSFERS ONE BYTE FROM THE
00744                    ;    APU STACK TO THE MPU B REG
00745                    ;    ****************************************************
00746
00747 F64F 8DD9    DREAD  BSR      APUIDL  ;WAIT FOR APU IDLE CONDITION
00748 F651 F6EC30         LDA B    DATAA   ;START READ
00749 F654 01             NOP              ;WAIT MANDATORY X CYCLES FOR
00750                    ;                  APU
00751 F655 01             NOP
00752 F656 01             NOP
00753 F657 F6EC33         LDA B    RDATA   ;READ DATA
00754 F65A 39             RTS
00755
00756                    ;    ****************************************************
00757                    ;    DATA PUSH SUBROUTINE
00758                    ;
00759                    ;    DPUSHA: PUSHES 2 OR 4 BYTES ON THE APU STACK
00760                    ;            DEPENDING ON THE APU COMMAND IN THE
00761                    ;            B REG.
00762                    ;    DPUSH2: PUSHES 2 BYTES ON THE APU STACK
00763                    ;    DPUSH4: PUSHES 4 BYTES ON THE APU STACK
00764                    ;
00765                    ;    THE X REG POINTS TO THE MSB AND THE LSB IS
00766                    ;    PUSHED ON THE STACK FIRST.
00767                    ;
00768                    ;              DPUSH2                 DPUSH4
00769                    ;           X     MSB             X      MSB
00770                    ;           X+1   LSB             X+1
00771                    ;                                 X+2
00772                    ;                                 X+3    LSB
00773                    ;    ****************************************************
00774
00775 F65B C11D    DPUSHA CMP B    #FLTS   ;COMMAND MBITS 5 AND 6 EQUAL
00776 F65D 2706           BEQ      DPUSH2  ;TO 1 FOR A 16 BIT OPERATION
00777 F65F C460           AND B    #60H    ;EXCEPT FLTS WHICH HAS BITS 5
00778 F661 C160           CMP B    #60H    ;AND 6 EQUAL 0 AND REQUIRE A
00779 F663 2606           BNE      DPUSH4  ;16 BIT OPERATION.
00780 F665 8602    DPUSH2 LDA A    #02H
00781 F667 09             DEX
00782 F668 09             DEX
00783 F669 2002           BRA      PSH10
00784
00785 F66B 8604    DPUSH4 LDA A    #4
00786 F66D E603    PSH10  LDA B    3,X     ;GET DATA FROM MEMORY AND
00787 F66F 8DD8           BSR      DWRITE  ;WRITE TO APU
00788 F671 09             DEX              ;POINT X TO NEXT LOCATION
00789 F672 4A             DEC A
00790 F673 26F8           BNE      PSH10
00791 F675 39             RTS
00792                    ;    ****************************************************
00793                    ;    PULL DATA SUBROUTINE
00794
00795
00796                    ;    DPULLA: PULLS 2 OR 4 BYTES FROM THE APU STACK
00797                    ;            DEPENDING ON THE COMMAND IN THE B REG
```

```
00798                   ;       DPULL2: PULLS 2 BYTES FROM THE APU STACK
00799                   ;       DPULL4: PULLS 4 BYTES FROM THE APU STACK
00800                   ;
00801                   ;       THE X REG POINTS TO THE LOCATION WHERE THE MSB
00802                   ;       WILL BE STORED. THE MSB IS PULLED FROM THE
00803                   ;       STACK FIRST.
00804                   ;
00805                   ;                 DPULL2            DPULL4
00806                   ;              X      MSB        X      MSB
00807                   ;              X+1    LSB        X+1
00808                   ;                                X+2
00809                   ;                                X+3    LSB
00810                   ;       ***************************************************
00811
00812  F676 C11F        DPULLA  CMP B   #FIXS    ;COMMAND BITS 5 & 6 = 1 FOR A
00813  F678 2706                BEQ     DPULL2   ;16 BIT OPERATION EXCEPT FIXS
00814  F67A C460                AND B   #60H     ;WHICH HAS BITS 5 & 6 = 0 AND
00815  F67C C160                CMP B   #60H     ;PRODUCES A 16 BIT RESULT
00816  F67E 2604                BNE     DPULL4
00817
00818  F680 8602        DPULL2  LDA A   #2
00819  F682 2002                BRA     PU10
00820
00821  F684 8604        DPULL4  LDA A   #4
00822  F686 BDC7        PU10    BSR     DREAD    ;GET DATA FROM STACK
00823  F688 E700                STA B   0,X      ;AND STORE IN MEMORY
00824  F68A 08                  INX              ;POINT X TO NEXT LOCATION
00825  F68B 4A                  DEC A
00826  F68C 26F8                BNE     PU10
00827  F68E 39                  RTS
00828
00830
00831                   ;       ***************************************************
00832                   ;
00833                   ;              MISCELLANEOUS SUBROUTINES FOR PROGRAM
00834                   ;
00835                   ;       ***************************************************
00836
00837                   ;       1- OUCHDS -OUTPUT CHARACTER TO DISPLAY
00838                   ;
00839                   ;       ENTRY   -(A)=ASCII VALUE OF CHARACTER
00840                   ;       EXIT    - SAME
00841                   ;       USES    -NONE
00842
00843  F68F 37          OUCHDS  PSH B            ;SAVE ACC B
00844  F690 C602                LDA B   #02H     ;MASK FOR CR
00845  F692 F5EC20      OUT1    BIT B   DISPSR
00846  F695 27FB                BEQ     OUT1
00847  F697 B7EC21              STA A   DISPDR   ;SEND (A) TO DISPLAY
00848  F69A 33                  PUL B            ;RESTORE ACC B
00849  F69B 39          OUT2    RTS
00850
00851                   ;       ***************************************************
00852                   ;       2- OUCHSR-OUTPUT CHARACTER TO SERVO
00853                   ;
00854                   ;       ENTRY   -(A)=ASCII VALUE OF CHARACTER
00855                   ;       EXIT    - SAME
00856
00857                   ;       ***************************************************
00858
00859  F69C 37          OUCHSR  PSH B            ;SAVE ACC B
00860  F69D C602                LDA B   #02H     ;MASK FOR CR
00861  F69F F5EC24      OUT3    BIT B   SERVSR
00862  F6A2 27FB                BEQ     OUT3
00863  F6A4 B7EC25              STA A   SERVDR   ;SEND (A) TO SERVO
00864  F6A7 33                  PUL B
00865  F6A8 39          OUT4    RTS
00866
00867                   ;       ***************************************************
```

```
00868
00869                    ;         3- OUSTSR OUTPUT CHARACTER STRING TO SERVO
00870                    ;         ENTRY    -(X)=ADDRESS OF STRING
00871                    ;         EXIT     -(X) = A NEGATIVE NUMBER
00872                    ;                  -(X) INCREMENTED PAST END OF STRING
00873                    ;         USES     -A,X,C
00874
00875                    ;         ****************************************************
00876
00877 F6A9 A600   OUSTSR  LDA A    0,X
00878 F6AB 08             INX
00879 F6AC 8DEE   OUSTS1  BSR      OUCHSR
00880 F6AE 2AF9           BPL      OUSTSR
00881 F6B0 39     OUSTS2  RTS
00882
00883                    ;         ****************************************************
00884
00885                    ;         4-OUSTDS OUPUT CHARACTER STRING TO DISPLAY
00886                    ;         ENTRY    -(X)= ADDRESS OF STRING
00887                    ;         EXIT     -(X)= A NEGATIVE NUMBER
00888                    ;         USES     -A,X,C
00889
00890 F6B1 A600   OUSTDS  LDA A    0,X
00891 F6B3 08             INX
00892 F6B4 8DD9   OUSTD1  BSR      OUCHDS
00893 F6B6 2AF9           BPL      OUSTDS
00894 F6B8 39     OUSTD2  RTS
00895
00896                    ;         ****************************************************
00897                    ;         5-BCD TO BINARY INTEGER CONVERSION -16 BIT
00898                    ;         ENTRY    -AC=BCD REG
00899                    ;         EXIT     -BC=BINARY RESULT
00900
00901 F6B9 8610   DBI     LDA A    #010H
00902 F6BB 36     DBI0    PSH A
00903 F6BC 740038         LSR      AC
00904 F6BF 760039         ROR      AC+1
00905 F6C2 76003A         ROR      BC
00906 F6C5 76003B         ROR      BC+1
00907 F6C8 CE0038         LDX      #AC
00908 F6CB A600   DBI1    LDA A    0,X
00909 F6CD 16             TAB
00910 F6CE 840F           AND A    #00FH
00911 F6D0 8008           SUB A    #008H
00912 F6D2 2502           BCS      DBI2
00913 F6D4 C003           SUB B    #003H
00914 F6D6 17     DBI2    TBA
00915 F6D7 8080           SUB A    #080H
00916 F6D9 2502           BCS      DBI3
00917 F6DB C030           SUB B    #030H
00918 F6DD E700   DBI3    STA B    0,X
00919 F6DF 08             INX
00920 F6E0 8C003A         CPX      #BC
00921 F6E3 26E6           BNE      DBI1
00922 F6E5 32             PUL A
00923 F6E6 4A             DEC A
00924 F6E7 26D2           BNE      DBI0
00925 F6E9 39             RTS
00927                    ;         ****************************************************
00928
00929                    ;         6-BINBC BINARY TO BCD CONVERSION ROUTINE
00930                    ;         ENTRY    -MSB,LSB = BINARY #
00931                    ;         EXIT     -UNTTEN  = 1 & 10 RESULT
00932                    ;                  HNDTHD   = 100 & 1000 RESULT
00933                    ;                  TENTSD   = 10,000 RESULT
00934
00935 F6EA 7F0045 BINBC   CLR      UNTTEN   ;CLEAR BEFORE CONVERSION
00936 F6ED 7F0046         CLR      HNDTHD
00937 F6F0 7F0047         CLR      TENTSD
```

```
00938  F6F3  CE0010              LDX     #0010H
00939
00940  F6F6  9645        BEGIN   LDA A   UNTTEN  ;UNITS COMPARE
00941  F6F8  16                  TAB
00942  F6F9  840F                AND A   #00FH
00943  F6FB  8005                SUB A   #005H
00944  F6FD  2B02                BMI     AT
00945  F6FF  CB03                ADD B   #003H
00946
00947  F701  17          AT      TBA             ;TENS COMPARE
00948  F702  84F0                AND A   #00F0H
00949  F704  8050                SUB A   #0050H
00950  F706  2B02                BMI     BTT
00951  F708  CB30                ADD B   #0030H
00952
00953  F70A  D745        BTT     STA B   UNTTEN  ;HUNDREDS COMPARE
00954  F70C  9646                LDA A   HNDTHD
00955  F70E  16                  TAB
00956  F70F  840F                AND A   #00FH
00957  F711  8005                SUB A   #005H
00958  F713  2B02                BMI     CTT
00959  F715  CB03                ADD B   #003H
00960
00961  F717  17          CTT     TBA
00962  F718  84F0                AND A   #00F0H
00963  F71A  8050                SUB A   #0050H
00964  F71C  2B02                BMI     DT
00965  F71E  CB30                ADD B   #0030H
00966
00967  F720  D746        DT      STA B   HNDTHD  ;TEN THOU COMPARE
00968  F722  9647                LDA A   TENTSD
00969  F724  16                  TAB
00970  F725  8005                SUB A   #005H
00971  F727  2B02                BMI     ET
00972  F729  CB03                ADD B   #003H
00973
00974  F72B  D747        ET      STA B   TENTSD
00975  F72D  780044              ASL     LSB
00976  F730  790043              ROL     MSB
00977  F733  790045              ROL     UNTTEN
00978  F736  790046              ROL     HNDTHD
00979  F739  790047              ROL     TENTSD
00980  F73C  09                  DEX
00981  F73D  26B7                BNE     BEGIN
00982  F73F  39                  RTS
00983
00984              ;    ********************************************
00985
00986              ;    7- TMD- TIME DELAY OF APPROX 2 SEC SUBROUTINE
00987              ;    ENTRY,EXIT - NONE
00988
00989  F740  CE2000      TMD     LDX     #02000H ;OUTSIDE LOOP
00990  F743  C622        TM1     LDA B   #022H   ;INSIDE LOOP
00991  F745  5A          TM2     DEC B
00992  F746  26FD                BNE     TM2
00993  F748  09                  DEX             ;THROUGH?
00994  F749  26F8                BNE     TM1     ; NO, TRY AGAIN
00995  F74B  39                  RTS
00996
00997              ;    ********************************************
00998
00999              ;    8-OUTND OUTPUT NUMBER TO DISPLAY
01000              ;    ENTRY - VALID SPEED IN SPEED REGISTER
01001              ;            INX POINTS TO THE ADDRESS OF THE  #.
01002              ;    EXIT -NONE
01003
01004  F74C  8604        OUTND   LDA A   #04H    ;OUTPUT 4 NUMBERS
01005  F74E  9740                STA A   CT
01006  F750  8600                LDA A   #00     ;CLEAR COUNT,LEAD0
```

```
01007  F752 9742              STA A    COUNT
01008  F754 9741              STA A    LEAD0
01009
01010  F756 A600      NEXT1   LDA A    0,X        ;GET NUMBER
01011  F758 7A0040            DEC      CT         ;DEC NUMBER COUNT
01012  F75B D642              LDA B    COUNT      ;ODD DIGIT ?
01013  F75D 0C                CLC
01014  F75E 54                LSR B
01015  F75F 2531              BCS      PART21     ; YES. PART2
01016  F761 44                LSR A
01017  F762 44                LSR A
01018  F763 44                LSR A
01019  F764 44                LSR A
01020
01021  F765 7C0042    CONT11  INC      COUNT      ;INC COUNT REG
01022  F768 4D                TST A               ;IS # = 0 ?
01023  F769 2618              BNE      CONVT1     ; NO, CONVERT TO ASCII
01024
01025  F76B D640              LDA B    CT         ;CHECK IF ENTIRE # IS = 0000
01026  F76D C100              CMP B    #00
01027  F76F 2607              BNE      CONT21     ; NOT YET, CHECK FOR LEADING 0.
01028
01029  F771 8630              LDA A    #30H       ;YES, OUTPUT 1 ZERO TO DISPLAY
01030  F773 BDF68F            JSR      OUCHDS
01031  F776 201F              BRA      FINI1
01032
01033  F778 D641      CONT21  LDA B    LEAD0      ; YES, IS IT A LEADING 0?
01034  F77A 2607              BNE      CONVT1     ; NO, OUTPUT ZERO TO DISPLAY
01035
01036  F77C 8620              LDA A    #20H       ;OUTPUT SPACE TO DISPLAY
01037  F77E BDF68F            JSR      OUCHDS     ;INSTEAD OF THE ZERO.
01038  F781 20D3              BRA      NEXT1      ;GET NEXT NUMBER.
01039
01040  F783 C601      CONVT1  LDA B    #01H       ;SET LEADING 0 FLAG
01041  F785 D741              STA B    LEAD0
01042  F787 8B30              ADD A    #30H       ;BCD TO ASCII
01043
01044  F789 BDF68F            JSR      OUCHDS     ;OUTPUT NUMBER TO DISPLAY
01045  F78C D640              LDA B    CT         ;CT= 0 ?
01046  F78E 2707              BEQ      FINI1      ; YES, FINISHED
01047  F790 20C4              BRA      NEXT1      ; NO, GET NEXT #
01048
01049  F792 08       PART21   INX
01050  F793 840F              AND A    #00FH      ;MASK 1/2 #
01051  F795 20CE              BRA      CONT11
01052
01053  F797 39       FINI1    RTS                 ;FINISHED, RETURN
01055
01056                    ;   *********************************************
01057
01058                    ;                 INTERUPT HANDLER ROUTINES
01059
01060                    ;   *********************************************
01061
01062                    ;   1-NMIH NON-MASKABLE INTERUPT HANDLER
01063                    ;          ENTRY-ENTER NEW LENGTH BUTTON PRESSED
01064                    ;          EXIT -SPEED CURVE SENT TO SERVO
01065
01066                    ;   READ THE DIE LENGTH AND THE CV LENGTH AND
01067                    ;          CONVERT TO BINARY NUMBER
01068
01069  F798 8600      NMIH    LDA A    #00        ;CLEAR VALID DATA SIGNAL
01070  F79A 971F              STA A    VALID
01071  F79C B7E400            STA A    LOOP       ;CLEARS THE LOOP CONTROL
01072
01073  F79F B6EF08            LDA A    DIELSB     ;READ, CONVERT THE DIE LENGTH
01074  F7A2 F6EF09            LDA B    DIEMSB
01075  F7A5 43                COM A
01076  F7A6 53                COM B
01077  F7A7 D73B              STA B    AC
```

```
01078 F7A9 9739           STA A    AC+1
01079 F7AB 9731           STA A    DBCD+1   ;STORE BCD VALUE FOR FUTURE
01080 F7AD D730           STA B    DBCD
01081
01082 F7AF BDF6B9          JSR     DBI      ;BCD TO BINARY INTEGER
01083 F7B2 DE3A            LDX     BC
01084 F7B4 DF12            STX     DIEL     ;RSULT = DIEL
01085
01086 F7B6 B6EF0C          LDA A   CORLSB   ;READ, CONVERT THE CV LENGTH
01087 F7B9 F6EF0D          LDA B   CORMSB
01088 F7BC 43              COM A
01089 F7BD 53              COM B
01090 F7BE C40F            AND B   #0FH     ;MASK OUT B4-B7
01091 F7C0 D738            STA B   AC
01092 F7C2 9739            STA A   AC+1
01093 F7C4 9733            STA A   CBCD+1   ;SAVE BCD VALUE FOR FUTURE
01094 F7C6 D732            STA B   CBCD
01095
01096 F7C8 BDF6B9          JSR     DBI      ;BCD TO BINARY INTEGER
01097 F7CB DE3A            LDX     BC
01098 F7CD DF17            STX     CVLN     ;RSULT = CVLN
01099
01100                   ;  *************************************************
01101                   ;  CALCULATE THE EFFECTIVE DIE LENGTH OF HEADER
01102                   ;             DIEL = DIEL +CVLN
01103                   ;  *************************************************
01104
01105 F7CF 9612           LDA A    DIEL     ;DIEL +CVLN
01106 F7D1 D613           LDA B    DIEL+1
01107 F7D3 DB18           ADD B    CVLN+1
01108 F7D5 9917           ADC A    CVLN
01109 F7D7 9712           STA A    DIEL     ;STORE RESULT IN DIEL
01110 F7D9 D713           STA B    DIEL+1
01111
01112                   ;  *************************************************
01113                   ;  RESET THE APU BEFORE BEGINNING THE CALCULATION
01114                   ;
01115                   ;  *************************************************
01116 F7DB 8680           LDA A    #80H     ;WRITING TO THE CTRL REG
01117 F7DD B7EC32         STA A    CTRL     ;RESETS THE APU
01118
01119                   ;  *************************************************
01120
01121                   ;  CALCULATE THE ACCEL/DECEL DISTANCE
01122                   ;  EQUATION = (6600 - (DIEL+CVLN))/400
01123
01124                   ;  *************************************************
01125
01126 F7E0 CE19C8         LDX      #019C8H  ;PUSH 6600 ON THE STACK
01127 F7E3 DF09           STX      TA1
01128 F7E5 8601           LDA A    #01H     ; 0 0 00 00 01
01129 F7E7 C600           LDA B    #NOPP    ;      R  A  B
01130 F7E9 BDF5C1         JSR      ARTH2
01131
01132 F7EC DE12           LDX      DIEL     ;DIEL + CVLN =TOS
01133 F7EE DF09           STX      TA1
01134 F7F0 DE17           LDX      CVLN
01135 F7F2 DF0B           STX      TA1+2
01136 F7F4 8686           LDA A    #86H     ; 1 0 00 01 10
01137 F7F6 C66C           LDA B    #SADD    ;      R  A  B
01138 F7F8 BDF5C1         JSR      ARTH2
01139
01140 F7FB 8680           LDA A    #80H     ;6600-TOS = TOS
01141 F7FD C66D           LDA B    #SSUB    ; 1 0 00 00 00
01142 F7FF BDF5C1         JSR      ARTH2    ;      R  A  B
01143
01144 F802 8680           LDA A    #80H     ;CONVERT TOS TO FLOAT
01145 F804 C61D           LDA B    #FLTS
01146 F806 BDF5C1         JSR      ARTH2
01147
```

```
01148 F809 CE0190         LDX     #0190H    ;PUSH 400 ON STACK
01149 F80C DF09           STX     TA1
01150 F80E 8681           LDA A   #81H      ; 1 0 00 00 01
01151 F810 C61D           LDA B   #FLTS     ;      R  A  B
01152 F812 BDF5C1         JSR     ARTH2
01153
01154 F815 8680           LDA A   #80H      ;TOS/4000
01155 F817 C613           LDA B   #FDIV
01156 F819 BDF5C1         JSR     ARTH2
01157
01158                ;    2-CALCULATE THE MAX FEED ROLL VELOCITY -FMAX
01159
01160 F81C CE0D67         LDX     #0D67H    ;CONVERT 3431 TO FLOAT
01161 F81F DF09           STX     TA1
01162 F821 8681           LDA A   #81H      ; 1 0 00 00 01
01163 F823 C61D           LDA B   #FLTS     ;      R  A  B
01164 F825 BDF5C1         JSR     ARTH2
01165
01166 F828 8680           LDA A   #80H      ;3431*DIS(TOS)=TOS
01167 F82A C612           LDA B   #FMUL
01168 F82C BDF5C1         JSR     ARTH2
01169
01170 F82F 8680           LDA A   #80H      ;SQRT (TOS)=SQRT(3431*DIS)
01171 F831 C601           LDA B   #SQRT
01172 F833 BDF5C1         JSR     ARTH2
01173
01174 F836 CE003C         LDX     #003CH    ;CONVERT 60 TO FLOAT
01175 F839 DF09           STX     TA1
01176 F83B 8681           LDA A   #81H      ; 1 0 00 00 01
01177 F83D C61D           LDA B   #FLTS
01178 F83F BDF5C1         JSR     ARTH2
01179
01180 F842 8680           LDA A   #80H      ;SROOT (TOS) * 60
01181 F844 C612           LDA B   #FMUL
01182 F846 BDF5C1         JSR     ARTH2
01183
01184 F849 8680           LDA A   #80H      ;PUSH TOS FOR FURTHER CALC
01185 F84B C617           LDA B   #PTOF
01186 F84D BDF5C1         JSR     ARTH2
01187
01188 F850 CE0489         LDX     #0489H    ;PUSH 8.6237 ON STACK
01189 F853 DF09           STX     TA1
01190 F855 CEFA00         LDX     #0FA00H
01191 F858 DF0B           STX     TA1+2
01192 F85A 8606           LDA A   #06H      ; 0 0 00 01 10
01193 F85C C600           LDA B   #NOPP
01194 F85E BDF5C1         JSR     ARTH2
01195
01196 F861 CE0019         LDX     #FMAX     ;SROOT*60/8.6237 = FMAX
01197 F864 DF04           STX     TABLE1+4
01198 F866 86B0           LDA A   #0B0H     ;1 0 11 00 00
01199 F868 C613           LDA B   #FDIV
01200 F86A BDF5C1         JSR     ARTH2
01201
01202                ;    CALCULATE THE MAX DIE CUTTER VELOCITY
01203
01204 F86D CE0042         LDX     #0042H    ;CONVERT 66 TO FLOAT
01205 F870 DF09           STX     TA1
01206 F872 8681           LDA A   #81H      ; 1 0 00 00 01
01207 F874 C61D           LDA B   #FLTS
01208 F876 BDF5C1         JSR     ARTH2
01209
01210 F879 8680           LDA A   #80H      ;SROOT*60/66 = DMAX
01211 F87B C613           LDA B   #FDIV
01212 F87D BDF5C1         JSR     ARTH2
01213
01214 F880 8680           LDA A   #80H      ;PUSH TOS FOR FUTURE CALC
01215 F882 C617           LDA B   #PTOF
01216 F884 BDF5C1         JSR     ARTH2
01217
```

```
01218 F887 86B0              LDA A    #0B0H      ;CONVERT AND STORE DMAX
01219 F889 C61F              LDA B    #FIXS
01220 F88B CE001D             LDX     #DMAX
01221 F88E DF04                STX    TABLE1+4
01222 F890 BDF5C1              JSR    ARTH2
01223
01224                     ;   CALCULATE THE CYCLE TIME OF ONE REVOLUTION
01225                     ;   OF THE DIE CUTTER. = CTIME
01226                     ;   EQUATION -CTIME = DMAX / 60
01227
01228
01229 F893 CE003C            LDX      #003CH     ;PUSH 60 ON THE STACK
01230 F896 DF09               STX     TA1
01231 F898 8681              LDA A    #81H       ; 1 0 00 00 01
01232 F89A C61D              LDA B    #FLTS
01233 F89C BDF5C1             JSR    ARTH2
01234
01235 F89F 8680              LDA A    #80H       ;EXCHANGE OPERANDS
01236 F8A1 C619              LDA B    #XCHF
01237 F8A3 BDF5C1             JSR    ARTH2
01238
01239 F8A6 8680              LDA A    #80H       ;DMAX/60 = CTIME
01240 F8A8 C613              LDA B    #FDIV
01241 F8AA BDF5C1             JSR    ARTH2
01242
01243 F8AD CE0020             LDX    #CTIME      ;STORE CTIME FOR FUTURE
01244 F8B0 DF04                STX    TABLE1+4
01245 F8B2 8670              LDA A    #70H
01246 F8B4 C600              LDA B    #NOPP
01247 F8B6 BDF5C1              JSR    ARTH2
01248
01249                     ;   CALCULATE THE DIE TIME FOR THE DIE TO PASS AND
01250                     ;   THE NEGATIVE CV LENGTH
01251                     ;   EQUATION - DTIME =((DIEL+CVLN)/6600) * CTIME
01252
01253 F8B9 9612             LDA A     DIEL       ;ADD DIEL AND CVLN AND
01254 F8BB D613             LDA B     DIEL+1     ;AND PUSH ON STACK
01255 F8BD DB18              ADD B    CVLN+1
01256 F8BF 9917              ADC A    CVLN
01257
01258 F8C1 9709             STA A     TA1
01259 F8C3 D70A             STA B     TA1+1
01260 F8C5 8681             LDA A     #81H
01261 F8C7 C61D             LDA B     #FLTS
01262 F8C9 BDF5C1            JSR     ARTH2
01263
01264 F8CC CE19C8            LDX     #019C8H    ;PUSH 6600 ON STACK
01265 F8CF DF09                STX    TA1
01266 F8D1 8681              LDA A   #81H
01267 F8D3 C61D              LDA B   #FLTS
01268 F8D5 BDF5C1             JSR    ARTH2
01269
01270 F8D8 8680              LDA A   #80H        ;DIEL/66 = TOS
01271 F8DA C613              LDA B   #FDIV
01272 F8DC BDF5C1             JSR    ARTH2
01273
01274 F8DF CE0020             LDX    #CTIME      ;PUSH CTIME ON STACK
01275 F8E2 DF04                STX    TABLE1+4
01276 F8E4 8643              LDA A   #43H
01277 F8E6 BDF5C1             JSR    ARTH2
01278
01279
01280 F8E9 8680              LDA A   #80H        ;CTIME * DIEL/66
01281 F8EB C612              LDA B   #FMUL
01282 F8ED BDF5C1             JSR    ARTH2
01283
01284                     ;   CALCULATE THE ACCEL TIME = ADTIME
01285                     ;   EQUATION- ADTIME = CTIME - DTIME
01286
01287 F8F0 CE0020             LDX    #CTIME      ;PUSH CTIME ON STACK
01288 F8F3 DF04                STX    TABLE1+4
```

```
01289  F8F5 8643       LDA A    #43H
01290  F8F7 C600       LDA B    #NOPP
01291  F8F9 BDF5C1     JSR      ARTH2
01292
01293  F8FC 8680       LDA A    #80H        ;EXCHANGE OPERANDS
01294  F8FE C619       LDA B    #XCHF
01295  F900 BDF5C1     JSR      ARTH2
01296
01297  F903 8680       LDA A    #80H        ;CTIME-DTIME = ADTIME
01298  F905 C611       LDA B    #FSUB
01299  F907 BDF5C1     JSR      ARTH2
01300
01301              ;   CALCULATE THE MAX # OF PULSES FROM DIE CUTTER
01302              ;        FOR EACH OF THE FOUR STEPS
01303
01304  F90A CE0019     LDX      #FMAX       ;FMAX*ADTIME
01305  F90D DF04       STX      TABLE1+4
01306  F90F 8683       LDA A    #83H        ; 1 0 00 00 11
01307  F911 C612       LDA B    #FMUL
01308  F913 BDF5C1     JSR      ARTH2
01309
01310  F916 CE0189     LDX      #0189H      ;PUSH 1.070 ON TO STACK
01311  F919 DF09       STX      TA1
01312  F91B CE0200     LDX      #0200H
01313  F91E DF0B       STX      TA1+2
01314  F920 8606       LDA A    #06H
01315  F922 C600       LDA B    #NOPP
01316  F924 BDF5C1     JSR      ARTH2
01317
01318  F927 8680       LDA A    #80H        ;FMAX*ADTIME/1.07
01319  F929 C613       LDA B    #FDIV
01320  F92B BDF5C1     JSR      ARTH2
01321
01322  F92E 8680       LDA A    #80H        ;PUSH TOS FOR FUTURE CALC
01323  F930 C617       LDA B    #PTOF
01324  F932 BDF5C1     JSR      ARTH2
01325
01326  F935 8EB0       LDA A    #0B0H       ;CONVERT PULSMX TO FIXED
01327  F937 C61F       LDA B    #FIXS
01328  F939 CE0024     LDX      #PULSMX
01329  F93C DF04       STX      TABLE1+4
01330  F93E BDF5C1     JSR      ARTH2
01331
01332  F941 DE24       LDX      PULSMX      ;CONVERT PULSMX TO BCD #
01333  F943 DF43       STX      MSB
01334  F945 BDF6EA     JSR      BINBC
01335  F948 9646       LDA A    HNDTHD
01336  F94A D645       LDA B    UNTTEN
01337  F94C 9724       STA A    PULSMX
01338  F94E D725       STA B    PULSMX+1
01339
01340  F950 8680       LDA A    #80H        ;PUSH TOS FOR FUTUTRE CALC
01341  F952 C617       LDA B    #PTOF
01342  F954 BDF5C1     JSR      ARTH2
01343
01344              ;   ***********************************************
01345
01346  F957 CE00C0     LDX      #00C0H      ;PUSH .7500 ON STACK
01347  F95A DF09       STX      TA1
01348  F95C CE0000     LDX      #0000H
01349  F95F DF0B       STX      TA1+2
01350  F961 8606       LDA A    #06H
01351  F963 BDF5C1     JSR      ARTH2
01352
01353  F966 8680       LDA A    #80H        ;PULSMX * .7500
01354  F968 C612       LDA B    #FMUL
01355  F96A BDF5C1     JSR      ARTH2
01356
01357  F96D CE0026     LDX      #PULS2      ;CONVERT AND STORE PULS2
```

```
01358 F970 DF04          STX     TABLE1+4
01359 F972 86B0          LDA A   #0B0H
01360 F974 C61F          LDA B   #FIXS
01361 F976 BDF5C1        JSR     ARTH2
01362
01363 F979 DE26          LDX     PULS2       ;CONVERT PULS2 TO BCD
01364 F97B DF43          STX     MSB
01365 F97D BDF6EA        JSR     BINBC
01366 F980 9646          LDA A   HNDTHD
01367 F982 D645          LDA B   UNTTEN
01368 F984 9726          STA A   PULS2
01369 F986 D727          STA B   PULS2+1
01370
01371 F988 8680          LDA A   #080H       ;PUSH TOS FOR FUTURE CALC
01372 F98A C617          LDA B   #PTOF
01373 F98C BDF5C1        JSR     ARTH2
01374
01375                ;   ********************************************
01376
01377 F98F CE7F80        LDX     #7F80H      ;PUSH .2500 ON STACK
01378 F992 DF09          STX     TA1
01379 F994 CE0000        LDX     #0000H
01380 F997 DF0B          STX     TA1+2
01381 F999 8606          LDA A   #06H
01382 F99B BDF5C1        JSR     ARTH2
01383
01384 F99E 8680          LDA A   #80H        ;PULSMX * .2500
01385 F9A0 C612          LDA B   #FMUL
01386 F9A2 BDF5C1        JSR     ARTH2
01387
01388 F9A5 CE0028        LDX     #PULS3      ;CONVERT AND STORE RESULT
01389 F9A8 DF04          STX     TABLE1+4
01390 F9AA 86B0          LDA A   #0B0H
01391 F9AC C61F          LDA B   #FIXS
01392 F9AE BDF5C1        JSR     ARTH2
01393
01394 F9B1 DE28          LDX     PULS3       ;CONVERT PULS3 TO BCD
01395 F9B3 DF43          STX     MSB
01396 F9B5 BDF6EA        JSR     BINBC
01397 F9B8 9646          LDA A   HNDTHD
01398 F9BA D645          LDA B   UNTTEN
01399 F9BC 9728          STA A   PULS3
01400 F9BE D729          STA B   PULS3+1
01401
01402 F9C0 8680          LDA A   #80H        ;PUSH TOS FOR FUTURE CALC
01403 F9C2 C617          LDA B   #PTOF
01404 F9C4 BDF5C1        JSR     ARTH2
01405
01406                ;   ********************************************
01407
01408 F9C7 CE7D19        LDX     #7D19H      ;PUSH .1000 ON THE STACK
01409 F9CA DF09          STX     TA1
01410 F9CC CE0000        LDX     #0000H
01411 F9CF DF0B          STX     TA1+2
01412 F9D1 8606          LDA A   #06H
01413 F9D3 BDF5C1        JSR     ARTH2
01414
01415 F9D6 8680          LDA A   #80H        ;PULSMX * .1000
01416 F9D8 C612          LDA B   #FMUL
01417 F9DA BDF5C1        JSR     ARTH2
01418
01419 F9DD CE002A        LDX     #PULS4      ;CONVERT AND STORE AT PULS4
01420 F9E0 DF04          STX     TABLE1+4
01421 F9E2 86B0          LDA A   #0B0H
01422 F9E4 C61F          LDA B   #FIXS
01423 F9E6 BDF5C1        JSR     ARTH2
01424
01425 F9E9 DE2A          LDX     PULS4       ;CONVERT PULS4 TO BCD
01426 F9EB DF43          STX     MSB
```

```
01427 F9ED BDF6EA          JSR     BINBC
01428 F9F0 9646            LDA A   HNDTHD
01429 F9F2 D645            LDA B   UNTTEN
01430 F9F4 972A            STA A   PULS4
01431 F9F6 D72B            STA B   PULS4+1
01432
01433 F9F8 8680            LDA A   #80H        ;PUSH TOS FOR FUTURE CALC
01434 F9FA C617            LDA B   #PTOF
01435 F9FC BDF5C1          JSR     ARTH2
01436
01437                  ;   ***************************************************
01438                  ;   ***************************************************
01439
01440                  ;   CALCULATE THE # OF PULSES FOR THE ENTERED
01441                  ;   DIE LENGTH FROM THE THUMBWHEELS
01442                  ;   EQUATION - DIEL * 1.1596
01443
01444 F9FF DE12            LDX     DIEL        ;PUSH DIE LENGTH ON THE STACK
01445 FA01 DF09            STX     TA1
01446 FA03 8681            LDA A   #81H
01447 FA05 C61D            LDA B   #FLTS
01448 FA07 BDF5C1          JSR     ARTH2
01449
01450 FA0A CE0194          LDX     #0194H      ;DIEL * 1.1596 = PULDIE
01451 FA0D DF09            STX     TA1
01452 FA0F CE6D00          LDX     #06D00H
01453 FA12 DF0B            STX     TA1+2
01454 FA14 8606            LDA A   #06H
01455 FA16 BDF5C1          JSR     ARTH2
01456
01457 FA19 8680            LDA A   #80H
01458 FA1B C612            LDA B   #FMUL
01459 FA1D BDF5C1          JSR     ARTH2
01460
01461 FA20 CE002C          LDX     #PULDIE     ;CONVERT AND STORE RESULT
01462 FA23 DF04            STX     TABLE1+4
01463 FA25 86B0            LDA A   #0B0H
01464 FA27 C61F            LDA B   #FIXS
01465 FA29 BDF5C1          JSR     ARTH2
01466
01467 FA2C DE2C            LDX     PULDIE      ;CONVERT PULDIE TO BCD
01468 FA2E DF43            STX     MSB
01469 FA30 BDF6EA          JSR     BINBC
01470 FA33 9646            LDA A   HNDTHD
01471 FA35 D645            LDA B   UNTTEN
01472 FA37 972C            STA A   PULDIE
01473 FA39 D72D            STA B   PULDIE+1
01474
01475                  ;   ***************************************************
01476
01477                  ;   CALCULATE THE # OF PULSES FOR THE ENTERED
01478                  ;   NEGATIVE CV FROM THE THUMBWHEELS
01479                  ;   EQUATION - CVLN * 1.1596
01480
01481 FA3B DE17            LDX     CVLN        ;PUSH CVLN ON THE STACK
01482 FA3D DF09            STX     TA1
01483 FA3F 8681            LDA A   #81H
01484 FA41 C61D            LDA B   #FLTS       ;CONVERT TO FLOATING
01485 FA43 BDF5C1          JSR     ARTH2
01486
01487 FA46 CE0194          LDX     #0194H      ;CVLN * 1.1596 =PULCV
01488 FA49 DF09            STX     TA1
01489 FA4B CE6D00          LDX     #06D00H
01490 FA4E DF0B            STX     TA1+2
01491 FA50 8606            LDA A   #06H
01492 FA52 BDF5C1          JSR     ARTH2
01493
01494 FA55 8680            LDA A   #80H
01495 FA57 C612            LDA B   #FMUL
01496 FA59 BDF5C1          JSR     ARTH2
01497
```

```
01498 FA5C CE002E        LDX     #PULCV    ;CONVERT AND STORE RESULT
01499 FA5F DF04          STX     TABLE1+4
01500 FA61 86B0          LDA A   #0B0H
01501 FA63 C61F          LDA B   #FIXS
01502 FA65 BDF5C1        JSR     ARTH2
01503
01504 FA68 DE2E          LDX     PULCV     ;CONVERT PULCV TO BCD
01505 FA6A DF43          STX     MSB
01506 FA6C BDF6EA        JSR     BINBC
01507 FA6F 9646          LDA A   HNDTHD
01508 FA71 D645          LDA B   UNTTEN
01509 FA73 972E          STA A   PULCV
01510 FA75 D72F          STA B   PULCV+1
01511
01512                 ;  ******************************************
01513
01514                 ;  RESET TABLE1+1 PONTER FOR SPEED CALCULATION
01515
01516 FA77 CE000D        LDX     #TA1+4
01517 FA7A DF04          STX     TABLE1+4
01518
01519                 ;  ******************************************
01520
01521                 ;  ALL VALUES ARE CALCULATED AT THIS POINT. NOW
01522                 ;  THE DATA MUST BE ENTERED IN THE SERVO VIA THE
01523                 ;  RS-232 PORT. THE SERVO MUST BE PUT IN THE EDIT
01524                 ;  MODE BEFORE ENTERING THE DATA.
01525
01526                 ;  ******************************************
01527
01528                 ;  OUTPUT MESSAGE THAT PROGRAM IS CALCULATED
01529
01530 FA7C 860D          LDA A   #0DH      ;CLEAR DISPLAY
01531 FA7E BDF68F        JSR     OUCHDS
01532
01533 FA81 CEFD0B        LDX     #THRU
01534 FA84 BDF6B1        JSR     OUSTDS
01535
01536                 ;  ******************************************
01537
01538 FA87 B6EF00        LDA A   OPTO1     ;READ THE OPTO RACK
01539 FA8A 840F          AND A   #0FH
01540 FA8C 8A70          ORA A   #70H      ;ENERGIZE THE EDIT MODE
01541 FA8E B7EF00        STA A   OPTO1
01542
01543 FA91 BDF740        JSR     TMD       ;WAIT 2 SEC
01544 FA94 BDF740        JSR     TMD       ;WAIT 2 SEC
01545
01546                 ;  CLEAR MOTION 80 SERVO MEMORY BY SENDING OUT $C
01547
01548 FA97 8624          LDA A   #24H      ;OUTPUT ASCII ($)
01549 FA99 BDF69C        JSR     OUCHSR
01550 FA9C 8643          LDA A   #43H      ;OUTPUT ASCII (C)
01551 FA9E BDF69C        JSR     OUCHSR
01552 FAA1 860D          LDA A   #0DH      ;OUTPUT ASCII CR
01553 FAA3 BDF69C        JSR     OUCHSR
01554 FAA6 BDF740        JSR     TMD
01555
01556                 ;  SET SERVO TO BEGINNING OF THE MEMORY BY
01557                 ;  SENDING OUT ($0)
01558
01559 FAA9 8624          LDA A   #24H      ;OUTPUT ASCII ($)
01560 FAAB BDF69C        JSR     OUCHSR
01561 FAAE 8630          LDA A   #30H      ;OUTPUT ASCII (0)
01562 FAB0 BDF69C        JSR     OUCHSR
01563 FAB3 860D          LDA A   #0DH      ;OUTPUT ASCII CR
01564 FAB5 BDF69C        JSR     OUCHSR
01565 FAB8 BDF740        JSR     TMD
01566
01567 FABB CEFCA8        LDX     #ANY2     ;OUTPUT ANY 0003
01568 FABE BDF6A9        JSR     OUSTSR
```

```
01569
01570 FAC1 CEFC84            LDX     #INCMI   ;SET FOR NEGATIVE ACCEL
01571 FAC4 DF3E              STX     INCR
01572 FAC6 BDFBAF            JSR     ACELL
01573
01574 FAC9 CEFCB2            LDX     #OUST1   ;TURN ON OUTPUT 1
01575 FACC BDF6A9            JSR     OUSTSR
01576
01577 FACF CEFC45            LDX     #RATE1   ;OUTPUT NEGATIVE CV LENGTH
01578 FAD2 BDF6A9            JSR     OUSTSR
01579 FAD5 CEFC84            LDX     #INCMI
01580 FAD8 BDF6A9            JSR     OUSTSR
01581 FADB CE002E            LDX     #PULCV
01582 FADE BDFC08            JSR     OUTNO
01583 FAE1 CEFC9E            LDX     #ANY1
01584 FAE4 BDF6A9            JSR     OUSTSR
01585
01586 FAE7 CEFCBD            LDX     #OUST2   ;TURN OFF OUTPUT 1
01587 FAEA BDF6A9            JSR     OUSTSR
01588
01589 FAED CEFC84            LDX     #INCMI   ;SET FOR NEGATIVE DECEL
01590 FAF0 DF3E              STX     INCR
01591 FAF2 BDFB52            JSR     DECELL
01592
01593 FAF5 CEFC7C            LDX     #INCPL   ;SET FOR POSITIVE ACEL
01594 FAF8 DF3E              STX     INCR
01595 FAFA BDFBAF            JSR     ACELL
01596
01597 FAFD CEFC45            LDX     #RATE1   ;OUTPUT RATE 9567
01598 FB00 BDF6A9            JSR     OUSTSR
01599 FB03 CEFC7C            LDX     #INCPL
01600 FB06 BDF6A9            JSR     OUSTSR
01601 FB09 CE002C            LDX     #PULDIE  ;OUPUT DIE LENGTH
01602 FB0C BDFC08            JSR     OUTNO
01603 FB0F CEFC9E            LDX     #ANY1    ;OUTPUT ANY 8000
01604 FB12 BDF6A9            JSR     OUSTSR
01605
01606 FB15 CEFC7C            LDX     #INCPL   ;SET FOR POSITIVE DECEL
01607 FB18 DF3E              STX     INCR
01608 FB1A BDFB52            JSR     DECELL
01609
01610                ;       *********************************************
01611                ;       PROGRAM HAS BEEN SENT TO THE SERVO, CHANGE
01612                ;       TO THE RUN MODE AND CUT ON THE VALID SIGNAL
01613                ;       RELAY TO THE SERVO
01614                ;       *********************************************
01615
01616 FB1D B6EF00            LDA A   OPTO1    ;CHANGE FROM EDIT TO RUN MODE
01617 FB20 840F              AND A   #0FH
01618 FB22 8AB0              ORA A   #0B0H
01619 FB24 B7EF00            STA A   OPTO1
01620
01621 FB27 8A80              ORA A   #80H     ;CUT ON THE VALID SIGNAL RELAY
01622 FB29 B7EF00            STA A   OPTO1
01623
01624                ;       *********************************************
01625
01626                ;       SET THE VALID DATA FLAG FOR MONITOR LOOP
01627
01628 FB2C 86FF              LDA A   #0FFH
01629 FB2E 971F              STA A   VALID
01630
01631                ;       CLEAR THE DISPLAY BEFORE NEW MESSAGE
01632
01633 FB30 860D              LDA A   #0DH
01634 FB32 BDF68F            JSR     OUCHDS
01635
01636 FB35 CEFCEF            LDX     #READY   ;TELL OPERATOR IT IS READY
01637 FB38 BDF6B1            JSR     OUSTDS
01638 FB3B BDF740            JSR     TMD      ;2 SEC DELAY
```

```
01639
01640 FB3E 7F0037            CLR     DIESET      ;CLEAR DIESET FLAG.
01641
01642 FB41 CE0000            LDX     #0000H      ;CLEAR SPEED BEFORE RE-ENTRY
01643 FB44 DF35              STX     SPEED
01645
01646
01647                 ;      ****************************************************
01648
01649                 ;      CORRECTION FOR MAX SPEED. THE HIGHEST SPEED
01650                 ;      FOR THE DIE CUTTER IS 110 RPM.
01651
01652 FB46 961E              LDA A   DMAX+1      ;DMAX > 110 RPM
01653 FB48 807F              SUB A   #7FH
01654 FB4A 2B05              BMI     NM1         ; YES, SET TO 110 RPM
01655
01656 FB4C CE006E             LDX    #006EH
01657 FB4F DF1D              STX     DMAX
01658
01659 FB51 3B       NM1      RTI                 ;RETURN TO MONITOR
01660                 ;      ****************************************************
01661                 ;      SUBROUTINES USED IN OUTPUTTING THE SERVO INFO
01662
01663                 ;      DECELL-THIS SUB DECELS THE SERVO SYSTEM
01664
01665                 ;      ENTRY   -INCR   = ADDRESS OF THE INC DIRECTION
01666                 ;              INC, I- =POSITIVE
01667                 ;              INC, I  =NEGATIVE
01668
01669 FB52 CEFC50   DECELL    LDX     #RATE2      ;OUTPUT RATE 3444
01670 FB55 BDF6A9             JSR     OUSTSR
01671 FB58 DE3E               LDX     INCR        ;INC, I
01672 FB5A BDF6A9             JSR     OUSTSR
01673 FB5D CE0024             LDX     #PULSMX     ;OUTPUT PULSMX
01674 FB60 BDFC08             JSR     OUTNO
01675 FB63 CEFC9E             LDX     #ANY1       ;OUTPUT ANY 6000
01676 FB66 BDF6A9             JSR     OUSTSR
01677
01678 FB69 CEFC5B             LDX     #RATE3      ;OUTPUT RATE 2870
01679 FB6C BDF6A9             JSR     OUSTSR
01680 FB6F DE3E               LDX     INCR        ;INC, I
01681 FB71 BDF6A9             JSR     OUSTSR
01682 FB74 CE0026             LDX     #PULS2      ;OUTPUT PULS2
01683 FB77 BDFC08             JSR     OUTNO
01684 FB7A CEFC9E             LDX     #ANY1       ;OUTPUT ANY 6000
01685 FB7D BDF6A9             JSR     OUSTSR
01686
01687 FB80 CEFC66             LDX     #RATE4      ;OUTPUT RATE 0957
01688 FB83 BDF6A9             JSR     OUSTSR
01689 FB86 DE3E               LDX     INCR        ;INC, I
01690 FB88 BDF6A9             JSR     OUSTSR
01691 FB8B CE0028             LDX     #PULS3      ;OUTPUT PULS3
01692 FB8E BDFC08             JSR     OUTNO
01693 FB91 CEFC9E             LDX     #ANY1       ;OUTPUT ANY 6000
01694 FB94 BDF6A9             JSR     OUSTSR
01695
01696 FB97 CEFC71             LDX     #RATE5      ;OUTPUT RATE 0382
01697 FB9A BDF6A9             JSR     OUSTSR
01698 FB9D DE3E               LDX     INCR        ;INC, I
01699 FB9F BDF6A9             JSR     OUSTSR
01700 FBA2 CE002A             LDX     #PULS4      ;OUTPUT PULS4
01701 FBA5 BDFC08             JSR     OUTNO
01702 FBA8 CEFC9E             LDX     #ANY1       ;OUTPUT ANY 6000
01703 FBAB BDF6A9             JSR     OUSTSR
01704
01705 FBAE 39                 RTS                 ;RETURN FROM SUBROUTINE
01707                 ;      ****************************************************
01708
01709                 ;      ACELL   -ENTRY  -INCR=ADDRESS OF THE INC COMP.
01710
```

```
01711 FBAF CEFC71      ACELL    LDX      #RATE5    ;OUTPUT RATE 0382
01712 FBB2 BDF6A9               JSR      OUSTSR
01713 FBB5 DE3E                 LDX      INCR      ;INC,I
01714 FBB7 BDF6A9               JSR      OUSTSR
01715 FBBA CE002A               LDX      #PULS4    ;OUTPUT PULS4
01716 FBBD 8D49                 BSR      OUTNO
01717 FBBF CEFC9E               LDX      #ANY1     ;OUTPUT ANY 8000
01718 FBC2 BDF6A9               JSR      OUSTSR
01719
01720 FBC5 CEFC66               LDX      #RATE4    ;OUTPUT RATE 0957
01721 FBC8 BDF6A9               JSR      OUSTSR
01722 FBCB DE3E                 LDX      INCR      ;INC,I
01723 FBCD BDF6A9               JSR      OUSTSR
01724 FBD0 CE0028               LDX      #PULS3    ;OUTPUT PULS3
01725 FBD3 8D33                 BSR      OUTNO
01726 FBD5 CEFC9E               LDX      #ANY1     ;OUTPUT ANY 8000
01727 FBD8 BDF6A9               JSR      OUSTSR
01728
01729 FBDB CEFC5B               LDX      #RATE3    ;OUTPUT RATE 2870
01730 FBDE BDF6A9               JSR      OUSTSR
01731 FBE1 DE3E                 LDX      INCR
01732 FBE3 BDF6A9               JSR      OUSTSR
01733 FBE6 CE0026               LDX      #PULS2    ;OUTPUT PULS2
01734 FBE9 8D1D                 BSR      OUTNO
01735 FBEB CEFC9E               LDX      #ANY1     ;OUTPUT ANY 8000
01736 FBEE BDF6A9               JSR      OUSTSR
01737
01738 FBF1 CEFC50               LDX      #RATE2    ;OUTPUT RATE 2444
01739 FBF4 BDF6A9               JSR      OUSTSR
01740 FBF7 DE3E                 LDX      INCR
01741 FBF9 BDF6A9               JSR      OUSTSR
01742 FBFC CE0024               LDX      #PULSMX   ;OUTPUT PULSMX
01743 FBFF 8D07                 BSR      OUTNO
01744 FC01 CEFC9E               LDX      #ANY1     ;OUTPUT ANY 8000
01745 FC04 BDF6A9               JSR      OUSTSR
01746
01747 FC07 39                   RTS                ;RETURN FROM SUB
01748                  ;**********************************************
01749
01750
01751                  ;        OUTNO- OUTPUT NUMBERS TO THE SERVO DRIVE
01752                  ;        ENTRY -INX POINTS TO THE ADDRESS OF THE #.
01753                  ;        EXIT  -INX INC PAST END OF STRING
01754
01755 FC08 8604      OUTNO      LDA A    #04H      ;OUTPUT 4 NUMBERS
01756 FC0A 9740                 STA A    CT
01757 FC0C 8600                 LDA A    #00       ;CLEAR COUNT,LEAD0
01758 FC0E 9742                 STA A    COUNT
01759 FC10 9741                 STA A    LEAD0
01760
01761 FC12 A600      NEXT       LDA A    0,X       ;GET NUMBER
01762 FC14 7A0040               DEC      CT        ;DEC NUMBER COUNT
01763 FC17 D642                 LDA B    COUNT     ;ODD DIGIT ?
01764 FC19 0C                   CLC
01765 FC1A 54                   LSR B
01766 FC1B 251D                 BCS      PART2     ;YES,PART2
01767 FC1D 44                   LSR A
01768 FC1E 44                   LSR A
01769 FC1F 44                   LSR A
01770 FC20 44                   LSR A
01771
01772 FC21 7C0042    CONT1      INC COUNT          ;INC COUNT REG.
01773 FC24 4D                   TST A              ;IS # = 0 ?
01774 FC25 2604                 BNE      CONVT     ;NO,CONVERT TO ASCII
01775 FC27 D641                 LDA B    LEAD0     ;YES,IS IT A LEADING 0?
01776 FC29 27E7                 BEQ      NEXT      ;YES,GET NEXT #
01777
01778 FC2B C601      CONVT      LDA B    #01H      ;SET LEADING 0 FLAG
01779 FC2D D741                 STA B    LEAD0
01780 FC2F 8B30                 ADD A    #30H      ;BCD TO ASCII CONVERT
01781
01782 FC31 BDF69C               JSR      OUCHSR    ;OUTPUT NUMBER TO SERVO
```

```
01783 FC34 D640              LDA B   CT        ;CT = 0 ?
01784 FC36 2707              BEQ     FINI      ; YES,FINISHED
01785 FC38 20D8              BRA     NEXT      ; NO,GET NEXT #
01786
01787 FC3A 08         PART2  INX
01788 FC3B 840F              AND A   #00FH     ;MASK 1/2 #
01789 FC3D 20E2              BRA     CONT1
01790
01791 FC3F 860D       FINI   LDA A   #0DH      ;SEND OUT A CARR RETURN
01792 FC41 BDF69C            JSR     OUCHSR
01793 FC44 39                RTS               ;FINISHED,RETURN
01794
01795
01796
01797                 ;       ***********************************************
01798
01799                 ;       MESSAGE TABLES USED TO COMMUNICATE THROUGH
01800                 ;       RS-232 C PORTS TO DISPLAY AND TO THE SERVO
01801
01802                 ;       ***********************************************
01803 FC45 52415445   RATE1  ASCII   "RATE 3827"
01803 FC49 20333832
01803 FC4D 37
01804 FC4E 0D                BYTE    0DH
01805 FC4F 80                BYTE    80H
01806
01807 FC50 52415445   RATE2  ASCII   "RATE 3444"
01807 FC54 20333434
01807 FC58 34
01808 FC59 0D                BYTE    0DH
01809 FC5A 80                BYTE    80H
01810
01811 FC5B 52415445   RATE3  ASCII   "RATE 2870"
01811 FC5F 20323837
01811 FC63 30
01812 FC64 0D                BYTE    0DH
01813 FC65 80                BYTE    80H
01814
01815 FC66 52415445   RATE4  ASCII   "RATE 0957"
01815 FC6A 20303935
01815 FC6E 37
01816 FC6F 0D                BYTE    0DH
01817 FC70 80                BYTE    80H
01818
01819 FC71 52415445   RATE5  ASCII   "RATE 0382"
01819 FC75 20303338
01819 FC79 32
01820 FC7A 0D                BYTE    0DH
01821 FC7B 80                BYTE    80H
01822
01823
01824 FC7C 494E4320   INCPL  ASCII   "INC I,-"
01824 FC80 492C2D
01825 FC83 80                BYTE    80H
01826
01827 FC84 494E4320   INCMI  ASCII   "INC I,"
01827 FC88 492C
01828 FC8A 80                BYTE    80H
01829
01830 FC8B 4D415820   OVSPD  ASCII   "MAX SPEED EXCEEDED"
01830 FC8F 53504545
01830 FC93 44204558
01830 FC97 43454544
01830 FC9B 4544
01831 FC9D 80                BYTE    80H
01832
01858 FD2A 44494520   DIECUT ASCII  "DIE CUTTER SPEED IS =        "
01858 FD2E 43555454
01858 FD32 45522053
01858 FD36 50454544
01858 FD3A 20495320
```

```
01858 FD3E 3D202020
01858 FD42 202020
01859 FD45 80                     BYTE    80H
01860
01861 FD46 4D415820   MAXSP        ASCII   "MAX SPEED OF DIE CUTTER EXCEEDED"
01861 FD4A 53504545
01861 FD4E 44204F46
01861 FD52 20444945
01861 FD56 20435554
01861 FD5A 54455220
01861 FD5E 45584345
01861 FD62 45444544
01862 FD66 80                     BYTE    80H
01863
01864                        ;    END OF MESSAGES
01865
01866                        ;    ****************************************
01867
01868                        ;           INTERUPT VECTOR POINTERS
01869
01870                        :    ****************************************
01871
01872      FFF8                    ORG     0FFF8H  ;BEGINNING OF INTERRUPTS
01873
01874
01875 FFF8 0000                    WORD    IRQH
***** ERROR 074: Undefined symbol
01876 FFFA 0000                    WORD    SWIH
***** ERROR 074: Undefined symbol
01877 FFFC F798                    WORD    NMIH    ;NON-MASKABLE INT. (FFFC-FFFD)
01878 FFFE F400                    WORD    POWER   ;RESET OR POWER-UP(FFFE-FFFF)
01879
01880
01881
01882
01883                              END
01833 FC9E 414E5920   ANY1         ASCII   "ANY 8000"
01833 FCA2 38303030
01834 FCA6 0D                      BYTE    0DH
01835 FCA7 80                      BYTE    80H
01836
01837 FCA8 414C4C20   ANY2         ASCII   "ALL 0003"
01837 FCAC 30303033
01838 FCB0 0D                      BYTE    0DH
01839 FCB1 80                      BYTE    80H
01840
01841 FCB2 4F555450   OUST1        ASCII   "OUTPUT 01"
01841 FCB6 55542030
01841 FCBA 31
01842 FCBB 0D                      BYTE    0DH
01843 FCBC 80                      BYTE    80H
01844
01845 FCBD 4F555450   OUST2        ASCII   "OUTPUT 00"
01845 FCC1 55542030
01845 FCC5 30
01846 FCC6 0D                      BYTE    0DH
01847 FCC7 80                      BYTE    80H
01848
01849 FCC8 52454144   GREET        ASCII   "READY TO BEGIN,PLEASE ENTER THE LENGTH"
01849 FCCC 5920544F
01849 FCD0 20424547
01849 FCD4 494E2C50
01849 FCD8 4C454153
01849 FCDC 4520454E
01849 FCE0 54455220
01849 FCE4 54484520
01849 FCE8 4C454E47
01849 FCEC 5448
01850 FCEE 80                      BYTE    80H
01851
```

```
01852  FCEF  50524F47       READY   ASCII   "PROGRAMMED AND READY TO RUN"
01852  FCF3  52414D4D
01852  FCF7  45442041
01852  FCFB  4E442052
01852  FCFF  45414459
01852  FD03  20544F20
01852  FD07  52554E
01853  FD0A  80             BYTE    80H
01854
01855  FD0B  50524F47       THRU    ASCII   "PROGRAM CALCULATED AND LOADING"
01855  FD0F  52414D20
01855  FD13  43414C43
01855  FD17  554C4154
01855  FD1B  45442041
01855  FD1F  4E44204C
01855  FD23  4F414449
01855  FD27  4E47
01856  FD29  80             BYTE    80H
01857
```

We claim:

1. System for operating web treatment apparatus, such as a high speed rotary die cutter, capable of accommodating dies of differing lengths on a die cylinder of fixed circumference and having feed roll means for feeding a web to be treated to said die cylinder for treatment thereby and for pulling such web back therefrom when such die is of a length less than the full circumference of said die cylinder and during non-engagement by said die, comprising:

position encoder means associated with such die cylinder for generating an output signal as said die cylinder rotates;

stored program servo drive means for said feed roll means;

input means for enabling an operator to enter the die length, die offset and the desired amount of pull-back or correction of web travel so as to synchronize the web travel with the die engagement;

microprocessor means for calculating velocity profile functions based upon the inputted die length, desired pull-back, and die offset; and means for downloading such velocity profile functions to said stored program servo drive means so that said servo drive means may be programmed to decelerate the movement of the web and then accelerate such web towards the web treatment apparatus to again be engaged thereby with no wastage of web material between passes while enabling generation of optimal velocity profiles for each selected die length and pullback length.

2. System defined in claim 1 further comprising means for triggering said microprocessor means once during each revolution of the die cylinder to initialize the program thereof, thereby eliminating possible cumulative error during multiple passes.

3. System defined in claim 2 wherein said means for triggering comprises proximity switch means associated with said die cylinder.

4. System defined in claim 1 wherein said microprocessor means generates a signal based on said die cylinder position encoder means indicative of the speed of said die cylinder and further comprising display means for displaying such speed to an operator.

5. System defined in claim 1 wherein the web treatment apparatus includes pull-off roll means for forming a storage or slack loop of web material between a supply roll thereof and the feed roll means, and further comprising electrically controllable variable speed drive means for said pull-off roll means, and said microprocessor means further provides a speed reference signal therefor derived from the die velocity and the die length as inputted thereto.

6. System defined in claim 5 further comprising means for monitoring the actual length of said slack loop and adjusting said pull-off roll means speed whenever said slack loop exceeds long or short preset limits thereof.

7. System defined in claim 1 wherein said means for inputting die length and pullback length comprises operator settable switch means.

8. Rotary web treatment apparatus, such as a high speed rotary die cutting, printing or embossing machine, provided with a die cylinder, die cylinder position encoder means for generating speed and position reference information as the die cylinder rotates, feed rolls, feed roll position encoder means for generating speed and position information as the feed rolls rotate; a microprocessor derived stored program driving servo drive means for rotating the feed rolls; pull-off roll means for withdrawing web material from a supply roll and maintaining a storage loop thereof leading to the feed rolls; and a microprocessor based system including manually entered input means for inputting data including the die length, die offset, and the length of pullback desired between cutting cycles wherein said microprocessor based system reads the speed and position reference information from the die cylinder position encoder means and provides speed and position command signals to the feed roll servo drive means dependent upon the inputted data to provide an optimum velocity profile for the feed rolls appropriate to the entered die length automatically.

9. Apparatus defined in claim 8 wherein said system also provides an appropriate voltage signal to the pull-off roll means to initialize the rate of input of web to the supply loop.

10. Apparatus defined in claim 9 further comprising a long-or-short loop photocell detector system further providing adjustment of pull-off roll means speed to maintain the supply loop within preset limits.

11. Apparatus defined in claim 10 further comprising means to maintain registration control, and to preserve synchronization of the feed roll servo means with the die, the die cylinder also being provided with means for generating a timing pulse on each revolution thereof.

12. Method for operating web treatment apparatus, such as a high speed rotary die cutter, capable of accommodating dies of differing lengths on a die cylinder of fixed circumference and having feed roll means and a stored program position controller and servo drive means therefor for feeding a web to be treated to said die cylinder for treatment thereby and for pulling such web back therefrom when such die is of a length less than the full circumference of said die cylinder and during non-engagement by said die, comprising:

generating an output signal from position encoder means associated with such die cylinder as said die cylinder rotates;

inputting by an operator the die length, die offset and the desired amount of pullback or correction of web travel so as to synchronize the web travel with the die engagement;

calculating velocity profile functions in a microprocessor with a program based upon the inputted die length, die offset and desired pullback, and downloading such velocity profile functions to said stored program position controller controlling servo drive means;

whereby said position controller may be programmed to decelerate and reverse the movement of such web and then again reverse and accelerate such web again towards the web treatment apparatus to again be engaged thereby with no wastage of web material between passes while enabling generation of optimal velocity profiles for each selected die length and pullback length.

13. Method defined in claim 12 further comprising triggering said position controller once during each revolution of the die cylinder in response to a signal generated therefrom to initialize the program thereof, thereby eliminating possible cumulative error during multiple passes.

14. Method defined in claim 12 wherein the web treatment apparatus includes pull-off roll means for forming a storage or slack loop of web material between a supply roll thereof and the feed roll means, and further comprises electrically controllable variable speed drive means for said pull-off roll means and wherein said microprocessor further provides a derived speed reference signal therefor from the die velocity and the die length as inputted thereto.

15. Method defined in claim 12 wherein operator input of die length and a correction length generates a non-maskable hardware interrupt to the microprocessor program, causing a branch to a sub-routine for recalculating the appropriate acceleration and deceleration profile whereby minimal web material is utiled and maximum rate of production is achieved.

16. Method defined in claim 15 wherein said program monitors the dye cylinder encoder means, calculates the speed thereof therefrom, calculates the rate of required web material usage therefrom and from the entered die length, and continuously sets the initial pull-off rate from a supply roll.

17. Method defined in claim 16 further comprising averaging the reference velocity of the die cylinder over a plurality of cycles and indicating such averaged velocity to the operator.

* * * * *